US012579803B2

(12) United States Patent　　　　(10) Patent No.: US 12,579,803 B2
Ersoy　　　　　　　　　　　　　　　　(45) Date of Patent: Mar. 17, 2026

(54) TOTAGRAPHY FOR SUPERRESOLUTION IMAGING AND SIGNAL PROCESSING OF POSITIVE, REAL-VALUED IMAGES AND SIGNALS

(71) Applicant: Gerchberg Ophthalmic Dispensing, PLLC, New York, NY (US)

(72) Inventor: Okan Ersoy, West Lafayette, IN (US)

(73) Assignee: WAVEFRONT ANALYSIS SYSTEMS LLC, New York, NY (US)

( * ) Notice: Subject to any disclaimer, the term of this patent is extended or adjusted under 35 U.S.C. 154(b) by 517 days.

(21) Appl. No.: 18/162,180

(22) Filed: Jan. 31, 2023

(65) Prior Publication Data

US 2023/0245440 A1　　　Aug. 3, 2023

Related U.S. Application Data

(60) Provisional application No. 63/305,302, filed on Feb. 1, 2022.

(51) Int. Cl.
　　*G06V 10/88*　　　　(2022.01)
　　*G06V 10/25*　　　　(2022.01)
(52) U.S. Cl.
　　CPC ............ *G06V 10/898* (2022.01); *G06V 10/25* (2022.01)
(58) Field of Classification Search
　　CPC ...... G06V 10/898; G06V 10/25; G02B 27/46; G01J 9/00
　　See application file for complete search history.

(56) References Cited

U.S. PATENT DOCUMENTS

| | | | |
|---|---|---|---|
| 5,050,220 A | 9/1991 | Marsh | |
| 5,086,222 A | 2/1992 | Shibuya | |
| 5,274,716 A | 12/1993 | Mitsuoka | |
| 5,426,521 A | 6/1995 | Chen | |
| 5,454,047 A | 9/1995 | Chang | |
| 5,768,242 A | 6/1998 | Juday | |
| 6,097,856 A | 8/2000 | Hammond, Jr. | |
| 6,229,649 B1 | 5/2001 | Woods | |
| 6,369,932 B1 | 4/2002 | Gerchberg | |
| 6,545,790 B2 | 4/2003 | Gerchberg | |
| 6,885,442 B1 | 4/2005 | Nugent | |
| 6,906,839 B2 | 6/2005 | Gerchberg | |
| 8,040,595 B2 | 10/2011 | Gerchberg | |
| 8,520,213 B2 | 8/2013 | Popescu | |
| 8,837,045 B2 | 9/2014 | Popescu | |
| 9,052,180 B2 | 6/2015 | Popescu | |
| 9,404,857 B2 | 8/2016 | Popescu | |
| 9,715,098 B2 | 7/2017 | Babacan | |
| 10,132,609 B2 | 11/2018 | Popescu | |
| 2002/0060831 A1 | 5/2002 | Gerchberg | |
| 2017/0059845 A1 | 3/2017 | Waller | |
| 2017/0146788 A1 | 5/2017 | Waller | |

(Continued)

OTHER PUBLICATIONS

Acquire mass and volume information in real time with label-free, quantitative imaging for live cells, assays, tissues and organoids, Phioptics, https://phioptics.com, 3 pages, 2020.

(Continued)

*Primary Examiner* — Carol W Chan
(74) *Attorney, Agent, or Firm* — Riverside Law LLP

(57) ABSTRACT

A method for recovering missing spectral amplitude and phase information of an input real, positive valued image or signal possibly carried by incoherent or coherent waves.

9 Claims, 62 Drawing Sheets

(56) References Cited

U.S. PATENT DOCUMENTS

| | | | | |
|---|---|---|---|---|
| 2018/0329191 A1* | 11/2018 | Cheng | .................. | G01R 31/311 |
| 2019/0107655 A1 | 4/2019 | Waller | | |
| 2019/0227490 A1* | 7/2019 | Waller | .................. | G02B 21/06 |
| 2019/0310374 A1 | 10/2019 | Gerchberg | | |

OTHER PUBLICATIONS

Bourquard et al. "A practical inverse-problem approach to digital holographic reconstruction," Optics Express, vol. 21, No. 3, pp. 3417-3433, Feb. 11, 2013.

Chandra et al. "PhasePack User Guide," https://github.com/tomgoldstein/phasepack-matlab, pp. 1-20, Nov. 29, 2017.

Cheng et al. "Phase retrieval and diffractive imaging based on Babinet's principle and complementary random sampling," Optics Express, vol. 23, No. 22, pp. 28874-28882, Nov. 2, 2015.

Eguchi et al. "Optimization of random phase diversity for adaptive optics using an LCoS spatial light modulator," Applied Optics, vol. 58, No. 25, pp. 6834-6840, Sep. 1, 2019.

Eguchi et al. "Single-shot phase retrieval with complex diversity," Optics Letters, vol. 44, Issue 21, pp. 5108-5112, 2019.

Gerchberg "A New Approach to Phase Retrieval of a Wave Front," Journal of Modern Optics,vol. 49, No. 7, pp. 1185-1196, 2002.

Gerchberg "Super-Resolution Through Error Energy Reduction," Optica ACTA, vol. 21, No. 9, pp. 709-720, 1974.

Gerchberg, et al. "A Practical Algorithm for the Determination of Phase from Image and Diffraction Plane Pictures," Optik, vol. 35, No. 2, pp. 237-246, 1972.

Horisaki, et al. "Single-shot phase imaging with a coded aperture," Optics Letters, vol. 39, No. 22, pp. 6466-6469, Nov. 15, 2014.

Pozzi et al. "Fast Calculation of Computer Generated Holograms for 3D Photostimulation through Compressive-Sensing Gerchberg-Saxton Algorithm," Methods and Protocols, pp. 1-11, 2019.

Yuan et al. "Phase Retrieval via Reweighted Wirtinger Flow," Appl. Opt., vol. 56, No. 9, pp. 1-21, Mar. 2017.

Yurtsever et al. "Sketchy Decisions: Convex Low-Rank Matrix Optimization with Optimal Storage," pp. 1-16, Feb. 22, 2017.

Zeng et al. "Coordinate Descent Algorithms for Phase Retrieval," IEEE, pp. 1-13, Jun. 2017.

Zheng et al. "Wide-field, High-resolution Fourier Ptychographic Microscopy," Nature Photonics, pp. 739-745, vol. 7, No. 9, Sep. 1, 2013.

* cited by examiner

29/62
REPLACEMENT SHEET

TOTAGRAPHY FOR SUPERRESOLUTION IMAGING AND SIGNAL PROCESSING OF POSITIVE, REAL-VALUED IMAGES AND SIGNALS

CROSS-REFERENCE TO RELATED APPLICATIONS

This application claims priority to U.S. Provisional Application No. 63/305,302 filed on Feb. 1, 2022, the contents of which are incorporated herein by reference in its entirety.

BACKGROUND OF THE INVENTION

Waves are usually characterized as coherent and incoherent. Coherent waves such as laser beams have amplitude and phase expressed as a complex number at each point in space. Incoherent waves such as daylight have only intensity which is like the square of amplitude and no phase at each point in space. Imaging with both types of waves is most often a linear system and can be analyzed by Fourier methods.

Waves are usually represented on planes. Then, they carry 2-D signals. 1-D signals carried by 1-D waves and audio signals are also of interest. The following disclosure applies to both 2-D signals and 1-D signals.

Coherent totagraphy (CT) is a new method for recovering phase of monochromatic coherent waves in which several measurements are generated by using special masks in an optical system with inputs and outputs. Its origins can be traced to Gerchberg's second method (Gerchberg, Journal of Modern Optics, 49:7, 1185-1196, 2002; Gerchberg, U.S. Pat. No. 6,369,932 B1, Apr. 9, 2002). The inputs are averaged and passed through masks for the next round of iteration between input and output. In this disclosure, incoherent totagraphy (IT) and coherent totagraphy 2 (CT2) for superresolution imaging and signal processing of positive, real-valued images and signals are developed in a similar approach. In the case of IT, the input intensity is positive real. In the case of CT2, the input image or signal is also assumed to be positive and real, meaning the input phase is zero. Once IT is covered, it is straightforward to extend it to the coverage of CT2. Hence, IT will be covered first in the disclosure.

In CT, the first mask is usually a transparent mask (equivalent to no mask). The succeeding masks are usually phase masks such as a bipolar binary mask with elements corresponding to +1 or −1, or a pair of complimentary unipolar binary masks with elements corresponding to +1 or 0. The pair of masks is such that +1 is 0 in the other mask, and vice versa. In other words, they are complimentary to each other. There is usually zero-filling at the boundaries of the masks corresponding to opaque regions. One bipolar binary mask or a pair of unipolar complimentary masks in addition to the transparent mask is usually sufficient for very high-quality reconstruction of information.

Masking in the sense of multiplying with the input image may also be achieved by using structured (pattern illuminated) light (Prakash et al., Phil. Trans. R. Soc. A 379: 20200143; Gustafsson, Journal of Microscopy, Vol. 198, Pt 2, May 2000, pp. 82-87). This is similar to what is done in Fourier Ptychographic Photography (FPP) (Dong et al., Photonics Research, Issue 1, pp. 19-23, 2015; Zheng, Morgan and Claypool Publishers, 2016). The differences are in the different illumination patterns used, and the different methods of image reconstruction.

Thus, there is a need in the art for new methods for recovering unknown information of positive, real-valued images and signals carried by incoherent or coherent monochromatic waves in which several measurements are generated and analyzed with Fourier methods.

SUMMARY OF THE INVENTION

A method for recovering missing spectral amplitude and phase information of an input real, positive valued image or signal possibly carried by incoherent or coherent waves, the method having the steps of: providing at least one transformation unit with an input and an output, providing at least two masks (illumination patterns) one of which is a transparent mask and the others are complimentary pairs of unipolar masks, each of the at least two masks configured to be disposed at the input, in the coherent case, the other masks can also be phase masks such as a bipolar binary masks with elements equal to +1 or −1, separately multiplying the input with each of the at least two masks to generate a modified input from each of the masks, convolving the modified inputs with the incoherent (optical) transfer function (OTF) or coherent transfer function (CTF) to yield the output consisting of positive real values to be detected by an output sensor, passing the output through the at least one transformation unit, wherein the at least one transformation unit performs Fourier transform of each output to produce spectral representation of each output corresponding to each modified input, determining two regions based on Region 1 in which the transfer function such as OTF or CTF has known values which are invertible, and Region 2 in which the OTF or CTF has very small, unknown or corrupted values, computing the amplitude and phase values of each spectral representation in Region 1, using the mean amplitude computed in Region 1 as the amplitude at each pixel in Region 2, choosing the corresponding phase as a random value in $[0, 2\pi]$ in Region 2, inverse Fourier transforming the plurality of the modified spectral representations to result in processed inputs, averaging the processed inputs to yield a single averaged input, separately applying the single averaged input at the input plane to each of the at least two masks to generate a modified input from each of the masks, iteratively processing the plurality of the modified inputs by keeping Region 2 and replacing Region 1 with the original Region 1 on the spectral plane until convergence is achieved to produce the amplitude and phase information of the original input.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION

Figure 1:
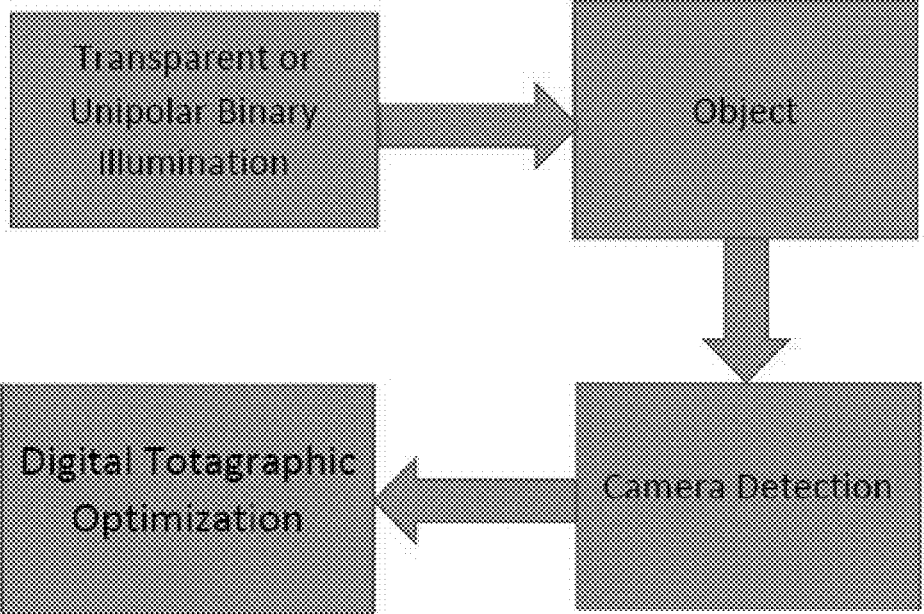
FIG. 1 is a schematic of a method for Incoherent Totagraphy according to an aspect of the disclosure.

It is to be understood that the figures and descriptions of the present invention have been simplified to illustrate elements that are relevant for a clear understanding of the present invention, while eliminating, for the purpose of clarity, many other elements found in related systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

Definitions

Definitions. As used in this description and the accompanying claims, the following terms shall have the meanings indicated, unless the context otherwise requires:

The term "totagram" is defined herein as the recovered positive, real-valued input information from the iterative spectral information recovery process using masks. The information can be one dimensional or multi-dimensional. In particular embodiments, the totagram is the reconstructed intensity of an input carried by an incoherent wave or coherent wave with zero input phase at a particular wavelength.

The term "totagraphy" or the "totagraphic method" is defined herein as the process of obtaining totagrams.

"Totagraphic imaging" involves recording of the images resulting from passing the input carried by an incoherent wave or coherent wave with zero input phase through a number of masks by a sensor/camera on the image plane in contrast to other imaging systems where there is usually a single recording of image information by a camera on the image plane.

Further definitions and aspects of the disclosed invention are related to in U.S. Pat. No. 6,369,932 granted Apr. 9, 2002; U.S. Pat. No. 6,545,790 granted Apr. 8, 2003; U.S. Pat. No. 8,040,595 granted Oct. 18, 2011; and U.S. Pat. No. 11,237,059 granted Feb. 1, 2022 all incorporated herein by reference in their entirety.

Incoherent Totagraphy for Super Resolution Imaging and Signal Processing

Coherent totagraphy (CT) is a new method for recovering phase of coherent waves in which several measurements are generated by using special masks in an optical system with inputs and outputs. This disclosure extends coherent totagraphy to incoherent totagraphy (IT) and coherent totagraphy 2 (CT2) for super-resolution imaging and signal processing of positive, real-valued images and signals. Masking can also be achieved by using structured illumination which will still be referred to as masking. The common theme is the use of one transparent mask and a number of other masks. With these masks, a number of measurements are carried out. In the disclosure, one transparent mask and a number of unipolar binary masks (elements having 0 and 1 values) are used. The system transfer function is identified with two regions as acceptable and unacceptable. These are called Region 1 (R1) and Region 2 (R2), respectively. The spectral amplitude and phase information are assumed known in R1, and unknown in R2. The spectral amplitude and phase information in R2 is recovered by iterative optimization somewhat similarly to the way it is done in CT. In CT, the spectral amplitude information is completely known at each point whereas the spectral phase information is completely unknown at each point. In IT and CT2, both amplitude and phase information are completely known in R1 and completely unknown in R2.

This disclosure introduces 1-D and 2-D totagraphy for superresolution imaging and signal processing of positive, real-valued images and signals. This may also be extended to higher dimensions. The main purpose is to recover high resolution information from low resolution information. 2-D IT is similar to Fourier Ptychographic Photography (FPP) with two major differences. The first one is the types of masks used. FPP uses masks with real numbered values between 0 and 1 whereas 2-D IT uses one transparent mask and a number of complimentary pairs of unipolar masks. In this regard, 2-D IT is believed to be easier to implement in hardware than FPP.

The second difference is the methods of iterative optimization used for image recovery. FPP uses an iterative optimization method based on gradient descent both on the input plane and the spectral plane. IT uses iterative totagraphic optimization which involves averaging of information due to different masks on the input plane, and modifying information on the spectral plane by using two regions decided by the transfer function.

Linear System Properties

In CT, the main purpose is to recover phase of a coherent wave. In incoherent sources of information, there is only amplitude (or intensity). However, both coherent and incoherent systems are often linear. Hence, convolution/deconvolution and Fourier transform processing are dominant, especially in imaging.

The linear system analysis starts with the coherent system impulse response function h(x, y) The related functions are given in the section Summary of Linear 2-D Incoherent Imaging. The incoherent system impulse response function (IPSF) is given by $$\text{IPSF}(x,y) = |h(x,y)|^2 \qquad \text{Equation 1}$$

The incoherent system transfer function H(·) called the optical transfer function (OTF) is the Fourier transform of $|h(x, y)|^2$. The main property of a linear time or space invariant system is that the system output is the convolution of the system input with the system impulse response function. In the Fourier space, this can be written as $$\text{FT(Output)} = \text{Transfer Function} * \text{FT(Input)} \qquad \text{Equation 2}$$

where * represents pointwise multiplication.

where FT means Fourier transform, and Equation 2 can be written as $$V(\cdot) = H(\cdot) * U(\cdot) \qquad \text{Equation 3}$$

where V(·) is FT(Output), and U(·) is FT(Input), and the multiplication is pointwise.

Incoherent Totagraphy

IT involves a proposed deconvolution method in which partial information recovery is used. This is different from the phase recovery method used in CT. The schematic for IT is shown in FIG. 1. Digital totagraphic optimization in FIG. 1 means the iterative process of modifications on the physical input domain, and modifications on the spectral domain until convergence. In order to minimize the number of indices, the variables U(·) and V(·) will mean their values at the current iteration with the current input mask. V(·) is the FT of the current output image (signal) measured. The current input image (signal) and the current output image (signal) measured will be denoted by u(·) and v(·), respectively. The simplest deconvolution method is to express Equation 3 as $$U(\cdot) = \frac{V(\cdot)}{H(\cdot)} \qquad \text{Equation 4}$$

where the division is pointwise. The trouble here is that H(·) often has many elements which are very small or zero. Then, Equation 4 becomes undefined. The method to be discussed relies first on the elements of H(·) which are at least a small amount larger than zero in absolute value so that they can be inverted. This condition can be written as $$|H(\cdot)| \geq \delta \qquad \text{Equation 5}$$

where $\delta$ is a small positive constant.

This can also be generalized to saying the elements of H(·) which are reliable. Region 1 will be defined as the region in which the condition in Equation 5 is true, or the elements of H(·) are reliable and invertible. Region 2 will be defined as the region in which the condition in Equation 5 is false, or the elements of H(·) are nonreliable.

This can be further generalized. Parts of H(·) may be unknown or incorrectly known. Then, Region 2 includes these parts. This topic is covered in more detail in the section Incompletely Known Optical Transfer Function. Let U'(·), V'(·), and H'(·) be the corresponding variables in Region 1. Then, Equation 4 can be written as $$U'(\cdot) = \frac{V'(\cdot)}{H'(\cdot)} \qquad \text{Equation 6}$$

without the problem of being undefined. Also let U"(·), V"(·), and H"(·) be the corresponding variables in Region 2. U"(·) is to be determined by the proposed iterative method discussed in the next section for partial information recovery.

The procedure for IT is as follows:
Given the wavelength $\lambda$ of the quasi-monochromatic field, and the numerical aperture NA of the optical system, the wave number k and system cutoff frequency $f_c$ are determined by $$k = \frac{2\pi}{\lambda} \qquad \text{Equation 7}$$

$$f_c = NA \cdot k \qquad \text{Equation 8}$$

The spectral sampling points are determined by $$k_x = \left[-\pi/psize, \pi/psize\right] \text{ at intervals } 2\pi/psize(n-1) \qquad \text{Equation 9}$$

$$k_y = \left[-\pi/psize, \pi/psize\right] \text{ at intervals } 2\pi/psize(n-1)$$

$$k_x = \left[\frac{-\pi}{psize}, \frac{\pi}{psize}\right] \text{ at intervals } \frac{2\pi}{psize(n-1)}$$

-continued $$k_y = \left[\frac{-\pi}{psize}, \frac{\pi}{psize}\right] \text{ at intervals } \frac{2\pi}{psize(n-1)}$$

where n is the number of data points used along the x and y directions and psize is the sampling interval which is also assumed to be the pixel size of the camera used.
The coherent transfer function CTF is determined by $$CTF(i, j) = \begin{cases} 1 & \text{if } \left(k_{xi}^2 + k_{yj}^2\right) < f_c^2 \\ 0 & \text{otherwise} \end{cases} \qquad \text{Equation 10}$$

The coherent point spread function (CPSF) is determined as the inverse Fourier transform (IFT) of the CTF.

The incoherent point spread function (IPSF) can also be written as $$\text{IPSF}(i,j) = |\text{CPSF}(i,j)|^2 \qquad \text{Equation 11}$$

The incoherent (optical) transfer function (OTF) also denoted by H(·) is determined as the Fourier transform (FT) of IPSF.

A method as disclosed herein is included as an optimization step, for example an iterative optimization step. The iterative optimization method introduced herein is disclosed below.

Iterative Optimization Method for Partial Information Recovery (MPIR)

The MPIR disclosed herein is for positive, real valued signals/images. The method discussed is explained with 2-D imaging applications, but can easily be adapted to other dimensional applications. The carrier input wave is assumed to be quasi-monochromatic with wavelength $\lambda$. In imaging applications, the sampling pixel size is assumed to be psize. The illumination patterns will be confined to a region of N×N pixels, and this is surrounded by a dark region of zeros so that the total size of each illumination pattern is 2N×2N. In analogy with previous work, the illumination patterns will also be referred to as masks.

The optical hardware measurements consist of the following:

1. The input image is multiplied with N masks, resulting in N images. These will be referred to as the modified inputs. The iterations to be discussed in the digital section are carried out with the N modified inputs either serially or in parallel.

Figure 53:
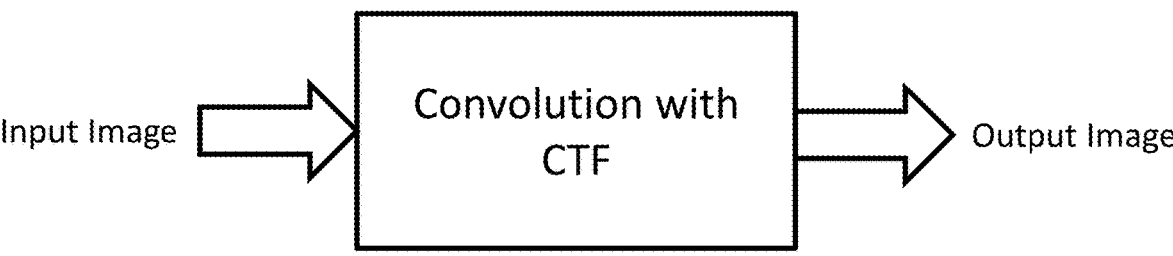
FIG. 53 is a diagram depicting a process wherein modified inputs are convolved with the CTF optically to yield the output images
Figure 54:
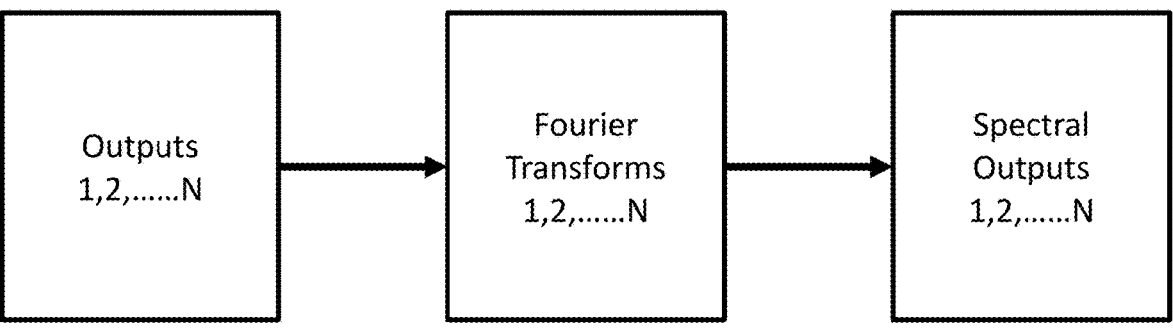
FIG. 54 is a diagram depicting a process wherein Fourier transforms of the recorded images give the corresponding spectra on the spectral plane.

2. The modified inputs are convolved with the OTF or CTF optically to yield the output images. This is shown in FIG. 53. The outputs also consist of positive real values. This is because the inputs are real positive, and so is the incoherent impulse response function given by Equation 1. Consequently, the outputs are correctly detected by an output sensor such as a CCD camera. The digital iterative optimization process carried out with all the images consists of the following:

The regular Fourier transforms of the recorded images give the corresponding spectra on the spectral plane. This is shown in FIG. 54. An important property which must be satisfied during iterations is that these spectra are conjugate symmetric, for example, $$V(-k_x, -k_y) = V^*(k_x, k_y) \qquad \text{Equation 12}$$

where $V(k_x, k_y)$ is one of the spectra.

3. Regions 1 is determined by using the condition in Equation 5, or the elements of H(·) are reliable. Region 2 is determined by these conditions being false.

4. In region 1, Equation 6 gives U'(·) in Region 1. It will be used in succeeding iterations without change.

Figure 55:
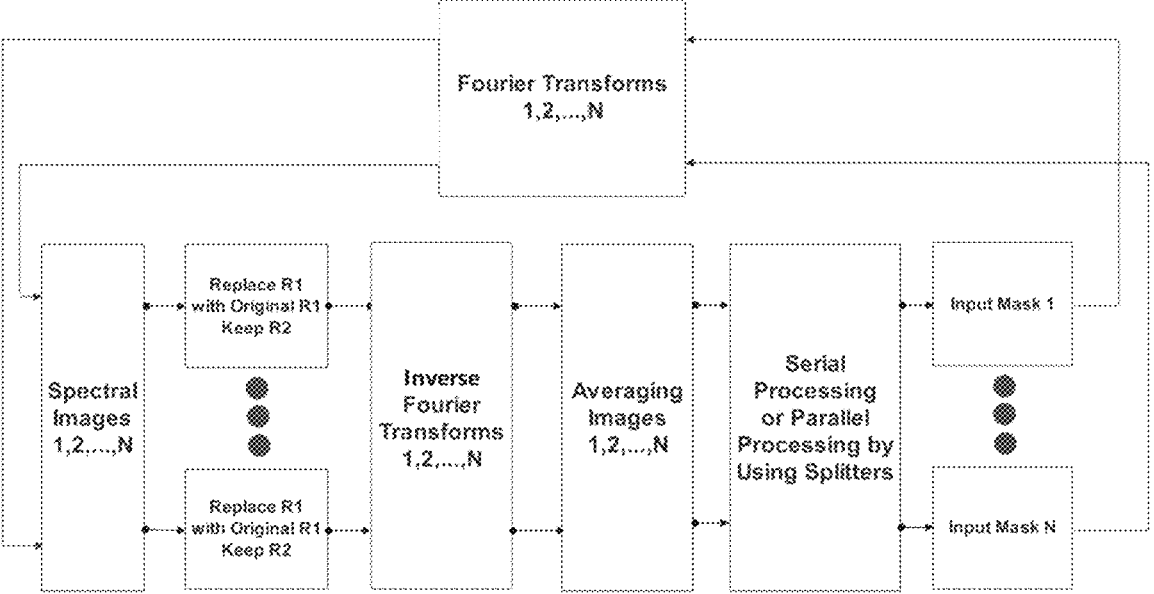
FIG. 55 is a schematic of the iterative method for Coherent Totagraphy 2 according to an aspect of the disclosure.

5. In Region 2, U"(·) is unknown. Before the iterations, it is initiated as follows: the mean amplitude computed in Region 1 is used as the amplitude at each pixel in Region 2, and the corresponding phase is chosen as a random value in [0,2π]. The result will be denoted by $U_2"(\cdot)$, which is used initially to approximate U"(·) in Region 2. The iterations described below are also visualized in FIG. 55.

6. Iterations are carried out for a given number of times or until convergence as follows:

(i) At the system input, the average of the current inputs is computed to generate the current average input.

(ii) The current average input is multiplied with the illumination patterns to generate the new modified inputs.

(iii) The modified inputs are transformed by using FFT.

(iv) In Region 1, $U_1'(\cdot)$ defined in step 4 above is used. In Region 2, the current spectral values are accepted to generate the new $U_2"(\cdot)$.

(v) The spectra are transformed back to the input, and the steps (i) thru (iv) are repeated as the new iteration.

Fourier Ptychographic Photography (FPP)

FPP is an incoherent imaging approach similar to IT (Dong et al., Photonics Research, Issue 1, pp. 19-23, 2015; Zheng, Morgan and Claypool Publishers, 2016)

Two major differences are the types of structured illumination (masks) used, and the image reconstruction methods.

In FPP, the illumination patterns $I_n$, n=1,2,3, . . . . N, where N is the number of illumination patterns used were generated by projecting the image of a semitransparent diffuser (white paint sprayed on a glass slide) on to the object, resulting in values between 0 and 1 (Dong et al., Photonics Research, Issue 1, pp. 19-23, 2015). The speckle size of the projection pattern was in the range from 200 to 500 microns. The different patterns were generated by using a mechanical scanner to move the transparent diffuser to different positions, corresponding to projection pattern shifts across the object. An example of this is shown by Dong et al, in their series of images displaying Incoherent Fourier ptychographic photography using structured light (Dong, Siyuan; Nanda, Pariksheet; Guo, Kaikai; Liao, Jun; Zheng, Guoan (2017): Media 1: Incoherent Fourier ptychographic photography using structured light. Optica Publishing Group. Media.

https://doi.org/10.1364/PRJ.3.000019.m001). In comparison, IT utilizes a transparent mask (complete illumination) and complimentary pairs of unipolar binary masks in image recovery. In this regard, 2-D IT is believed to be easier to implement in hardware than FPP.

As in most iterative phase recovery methods, the image recovery with FPP is achieved by iterations between the spatial (input) domain and the Fourier domain. The iterations start with an initial guess of the input. The iterations are repeated until the solution converges. The variables U(·), and V(·) are as defined previously with respect to each iteration and each masking pattern. The forward processing from the input to the spectrum is given by Equation 3.

The gradient-based iterative optimization method used in FPP is different from the iterative totagraphic method used in IT. They are comparatively discussed below.

Gradient-Based Optimization

Let $U_{cur}(\cdot)$ and $U_{new}(\cdot)$ denote the current and updated U(·), respectively.

The gradient-based optimization step on the spectral plane is given by (Dong et al., Photonics Research, Issue 1, pp. 19-23, 2015):

$$U_{new}(\cdot)=U_{cur}(\cdot)+H(\cdot)(V(\cdot)-H(\cdot)U_{cur}(\cdot)) \qquad \text{Equation 13}$$

Let $u_{cur}(\cdot)$ and $u_{new}(\cdot)$ denote the current and updated u(·) image after masking (pattern illumination), respectively. Also let $u_{dcur}(\cdot)$ and $u_{dnew}(\cdot)$ denote the current and updated input image before masking (pattern illumination), respectively. The gradient-based optimization step on the input plane is given by (Dong et al., Photonics Research, Issue 1, pp. 19-23, 2015).

$$u_{dnew}(\cdot) = u_{dcur}(\cdot) + \frac{I(\cdot)}{[\max I]^2}(u_{new}(\cdot) - u_{cur}(\cdot)) \qquad \text{Equation 14}$$

where I(·) is the current mask (illumination pattern).

Totagraphic Optimization

The gradient-based and totagraphic optimizations are both iterative methods, but they are different in the types of masks used, and in the steps discussed above. Instead of optimization steps expressed by Eqs. (13) and (14), the totagraphic optimization relies on the regions 1 and 2 in the spectral domain defined in the section Incoherent Totagraphy, and the method of MPIR discussed in the section Iterative Optimization Method for Partial Information Recovery (MPIR). In particular, the last step in the MPIR procedure illustrates the differences from Eqs. (13) and (14), as repeated below:

At the system input, the average of the current inputs is computed to generate the current average input.

The current average input is multiplied with the masking patterns to generate the new modified inputs.

The modified inputs are transformed by using FFT.

In Region 1, $U_1'(\cdot)$ defined in the section Incoherent Totagraphy is used. In Region 2, the current spectral values are accepted to generate the new $U_2'(\cdot)$.

One-Dimensional Incoherent Totagraphy

1-D IT is similar to 2-D IT except for 2-D variables replaced by 1-D variables. Hence, the variables will be denoted by the same letters. The purpose is to recover a high-resolution signal from a low resolution signal, for example, a lowpass filtered signal. The filtering system is assumed to have an impulse response h(t) and a transfer function H (f) which are FT pairs. The masks to be used are 1-D.

The 2-D MPIR method discussed in the section Iterative Optimization Method for Partial Information Recovery (MPIR) becomes the 1-D MPIR method here. As before, the regions 1 and 2 are determined by $$H(f)|\geq\partial \qquad \text{Equation 5}$$

or the elements of H(·) are reliable.

This leads to $U_1'(\cdot)$ and $U_2'(\cdot)$ as discussed in the section Iterative Optimization Method for Partial Information Recovery (MPIR). Initially, $U_2'(\cdot)$ is not known. It was set to the null vector in the experiments.

The iterations are carried out exactly as discussed in the last steps of the MPIR method of the section Iterative Optimization Method for Partial Information Recovery (MPIR).

Summary of Linear 2-D Incoherent Imaging Systems

Figure 35:
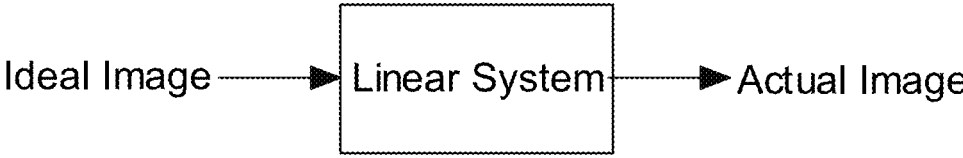
FIG. 35 is a diagram depicting a linear system interpretation of coherent and incoherent imaging according to aspects of the disclosed method.
Figure 36:
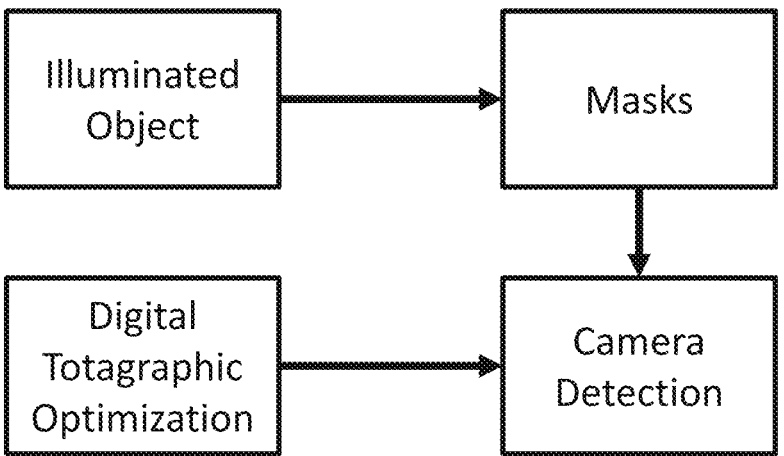
FIG. 36 is a schematic for Coherent Totagraphy 2 according to aspects of the disclosed method.

Linear coherent and incoherent systems are characterized by an impulse response and the corresponding transfer function. This is visualized in FIG. 35.

In a coherent imaging system, the impulse response is given by $$h(x_0, y_0) = \int\int_{-\infty}^{\infty} P(\lambda d_0 x, \lambda d_0 y)e^{-j2\pi(x_0 x + y_0 y)}dxdy \qquad \text{Equation 15}$$

The impulse response is observed to be the 2-D FT of the scaled pupil function of the lens. The final image is the convolution of the perfect image with the system impulse response. This smoothing operation can strongly attenuate the fine details of the image.

In a more general imaging system with many lenses, Eq. (15) remains valid provided that P(·) denotes the finite equivalent exit pupil of the system, and the system is diffraction limited. An optical system is diffraction limited if a diverging spherical wave incident on the entrance pupil is mapped into a converging spherical wave at the exit pupil.

Incoherent imaging systems are linear in intensity. The visual quality of an image is largely determined by the contrast of the relative intensity of the information-bearing details of the image to the ever-present background. The output image and the input ideal image can be normalized by the total image energy to reflect this property:

$$I'(x_0, y_0, d_0) = \frac{I(x_0, y_0, d_0)}{\int\int_{-\infty}^{\infty} I(x_0, y_0, d_0)dx_0 dy_0} \qquad \text{Equation 16}$$

$$I'_G(x, y) = \frac{I_G(x, y)}{\int\int_{-\infty}^{\infty} I_G(x, y)dxdy}$$

Let us denote the 2-D FT of $I'(x_0, y_0, d_0)$ and $I'_G(x, y)$ by $J(f_x, f_y)$ and $J_G(f_x, f_y)$, respectively. The convolution theorem yields $$J(f_x, f_y) = H_I(f_x, f_y)J_G(f_x, f_y) \qquad \text{Equation 17}$$

where $$H_I(f_x, f_y) = \frac{\int\int_{-\infty}^{\infty} |h(x, y)|^2 e^{-j2\pi(f_x x + f_y y)}}{\int\int_{-\infty}^{\infty} |h(x, y)|^2 dxdy}dxdy \qquad \text{Equation 18}$$

$H_I(f_x, f_y)$ is called the optical transfer function (OTF). The modulation transfer function (MTF) is defined as $|H_I(f_x, f_y)|$.

It is observed that $H_I(f_x, f_y)$ is the normalized FT of $|h(x, y)|^2$, a nonnegative function. This also means $H_I(f_x, f_y)$ is the normalized autocorrelation of $H(f_x, f_y)$:

$$H_I(f_x, f_y) = \frac{\int\int_{-\infty}^{\infty} H(f'_x, f'_y)H^*(f_x + f'_x, f_y + f'_y)df'_x df'_y}{\int\int_{-\infty}^{\infty} |H(f_x, f_y)|^2 df_x df_y} \qquad \text{Equation 19}$$

The most important properties of the OTF are the following:

$H_I(0,0)=1$;

$H_I(-f_x,f_y)=H_I(f_x,f_y)$;

$|H_I(f_x,f_y)| \le H_I(0,0)$.

The last property is a consequence of Schwarz' inequality, which states that, for any two complex-valued functions f and g, $$|\int\int fg dA|^2 \le \int\int |f|^2 dA \int\int |g|^2 dA \qquad \text{Equation 20}$$

with equality if g=Kf* where K is a complex constant.

Letting f and g be equal to $H(f'_x, f'_y)$ and $H(f_x + f'_x, f_y + f'_y)$, respectively, and using Eq. (20) yields Property as described above.

The incoherent transfer function can also be written as $$H_I(f_x, f_y) = \frac{\int\int_{-\infty}^{\infty} P(\lambda d_0 f'_x, \lambda d_0 f'_y)P(\lambda d_0(f_x + f'_x), \lambda d_0(f_y + f'_y))df'_x df'_y}{\int\int_{-\infty}^{\infty} P(\lambda d_0 f_x, \lambda d_0 f_y)df_x df_y} \qquad \text{Equation 21}$$

where the fact $P^2=P$ is used in the denominator.

Incorporating a change of variables, Equation (21) can be written as $$H_I(f_x, f_y) = \frac{\int\int_{-\infty}^{\infty} P\left(f'_x + \frac{\lambda d_0 f_x}{2}, f'_y + \frac{\lambda d_0 f_y}{2}\right)P\left(f'_x - \frac{\lambda d_0 f_x}{2}, f'_y - \frac{\lambda d_0 f_y}{2}\right)df'_x df'_y}{\int\int_{-\infty}^{\infty} P(\lambda d_0 f'_x, \lambda d_0 f'_y)} \qquad \text{Equation 22}$$

The two pupil functions in the numerator above are displaced from each other by $(\lambda d_0|f_x|, \lambda d_0|f_y|)$ where lambda $\lambda$ is the wavelength, and $d_0$ is the diameter of the pupil d, function of the lens system.

The integral equals the area of overlap between the two pupil functions. Hence, $H_I(f_x, f_y)$ can be written as $$H_I(f_x, f_y) = \frac{\text{area of overlap}}{\text{total area}} \qquad \text{Equation 23}$$

Coherent Totagraphy for Super Resolution Imaging

Coherent totagraphy (CT1) is a new method for recovering phase of coherent waves in which several measurements are generated by using special masks in an optical system with inputs and outputs. This disclosure extends CT1 to CT2 for super-resolution imaging and signal processing. This is for the case of the spectral amplitude and phase information being known in certain regions and unknown in other regions. This was first developed with incoherent totagraphy (IT) as discussed above. The common theme is the use of one transparent mask and a number of other masks. With these masks, a number of measurements are carried out. The coherent transfer function CTF is identified with two regions as acceptable and unacceptable. The spectral amplitude and phase information are assumed known in the acceptable region, and unknown in the unacceptable region. The spectral amplitude and phase information in the unacceptable region is recovered by iterative optimization similarly to the way it is done in IT.

The 1-D coherent totagraphy for superresolution signal processing with 1-D positive, real valued signals can be developed in the same way as the 1-D incoherent totagraphy for superresolution signal processing discussed above.

Linear System Properties

In a linear shift-invariant coherent system, the coherent transfer function (CTF) is the scaled pupil function given by $$H(x,y)=P(\lambda d_0 x, \lambda d_0 y) \qquad \text{Equation 24}$$

where $\lambda$ is the wavelength, and $d_0$ is the diameter of the pupil function of the lens system. The other details of CT2 are the same as in IT, with the replacement of optical transfer function OTF by the coherent transfer function CTF.

Figure 58A:
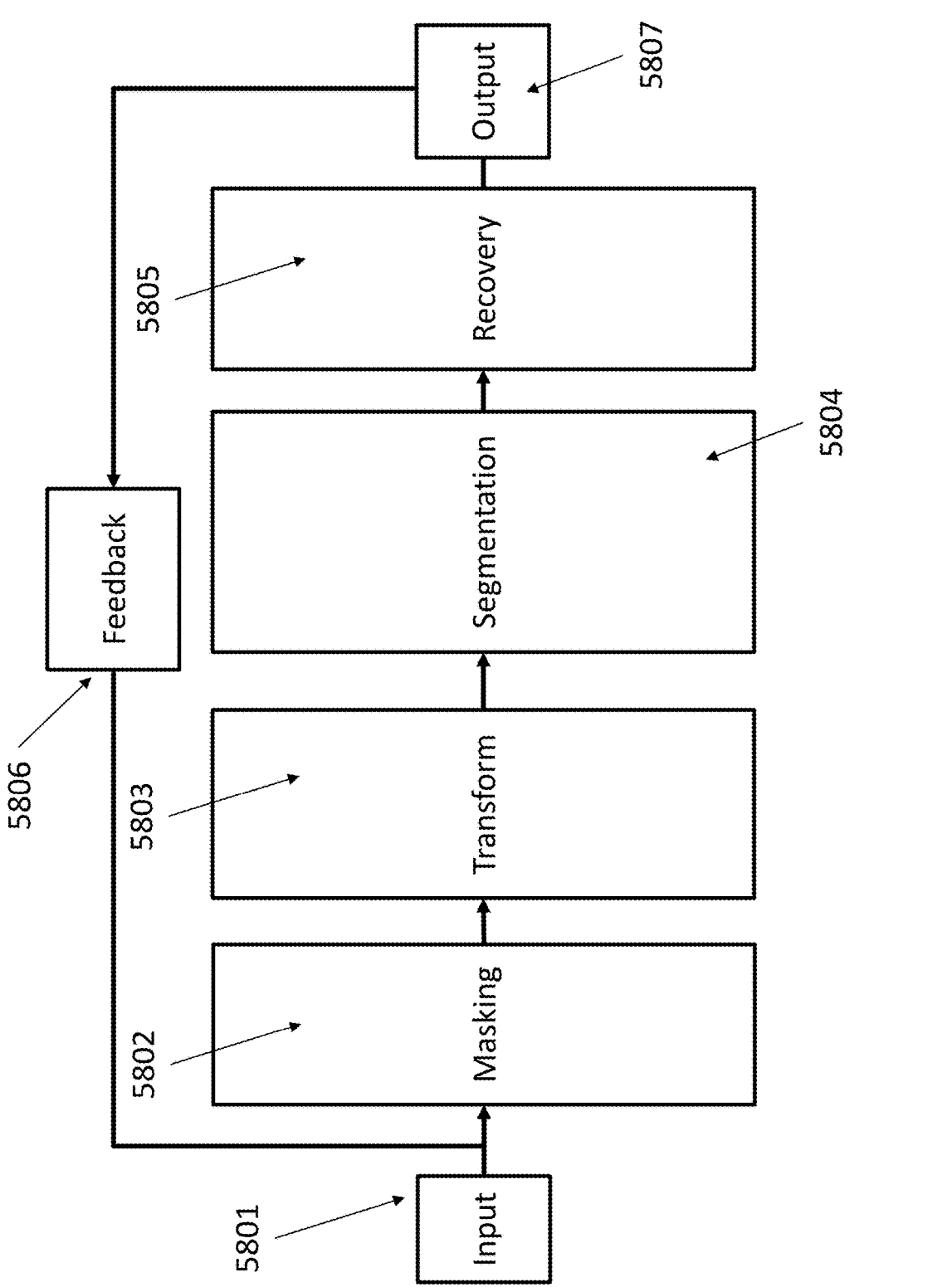
FIG. 58A shows a flow diagram of an exemplary method of image recovery.

One embodiment of a system as disclosed herein is presented with reference to FIG. 58A-FIG. 58E. With reference to FIG. 58A, an overall system diagram view is shown dividing the method steps into subgroups, starting with an input 5801, a masking unit 5802, a transform unit 5803, a segmentation unit 5804, a recovery unit 5805, an output 5807, and a feedback pathway 5806 which feeds back into the input of the masking unit 5802.

Figure 58B:
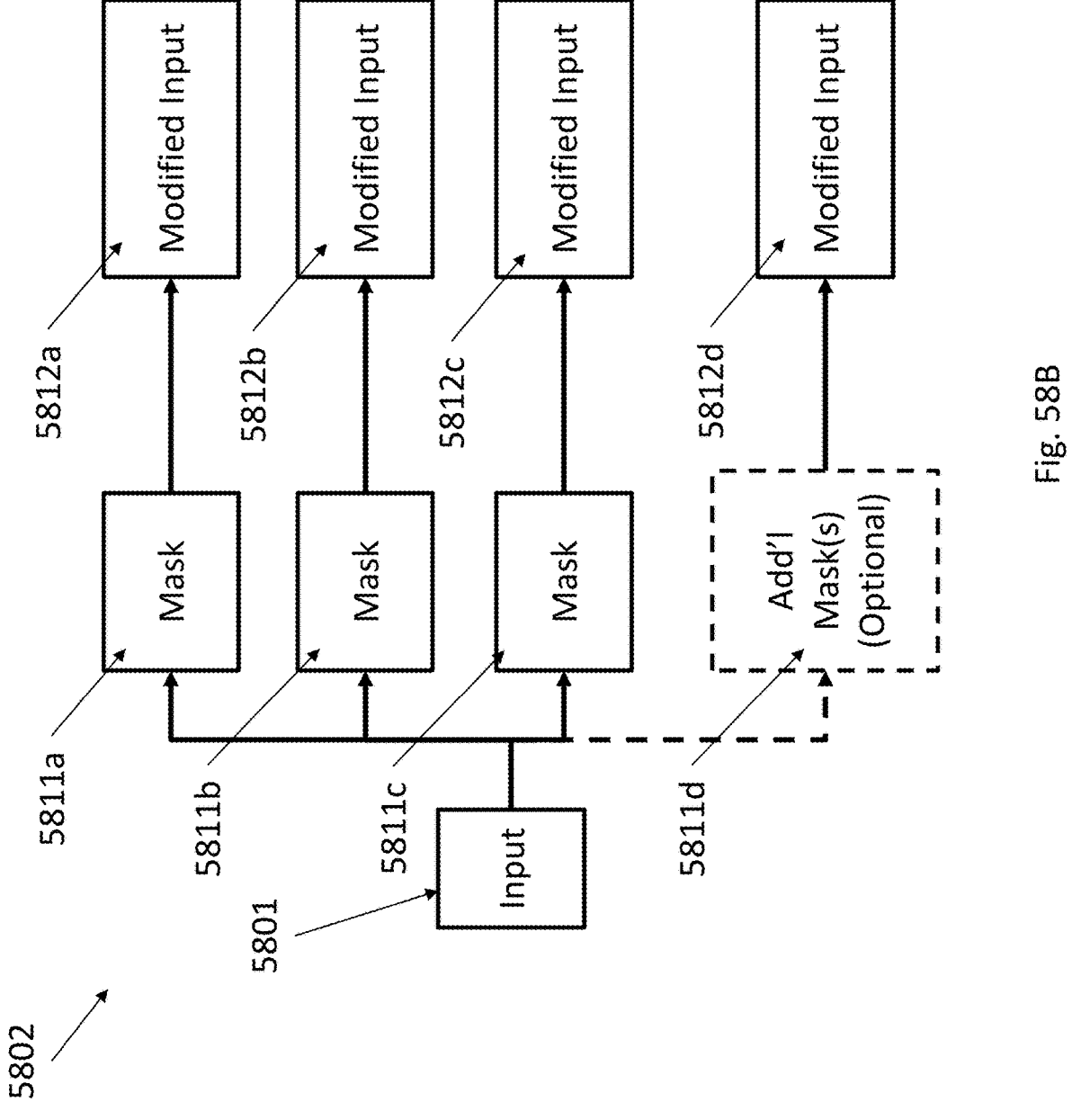
FIG. 58B-FIG. 58E show detail views of various subsections of the method of FIG. 58A.

With reference to FIG. 58B, a detail view of the masking unit 5802 is shown. The masking unit takes as its input 5801 an input image or signal, which may in some iterations be the feedback result 5806 (see FIG. 58A). The input image or signal is then subjected to masking or illumination by at least three masks or illumination patterns 5811a, 5811b, 5811c (optionally 5811d). In one embodiment, a first mask 5811a is a transparent mask which may in some embodiments have a border. In one embodiment, the second and third masks 5811b and 5811c are complementary binary masks which may have a border. In some embodiments, the border of the first mask and the border of the second/third masks are the same. Although some embodiments disclosed herein may refer to masks or illumination patterns being applied to an input signal, it is understood that neither should be limiting, and that the terms "mask" and "illumination pattern" may be interchanged when referring to appropriate input signals or images. In the depicted embodiment, the masking/illumination results in modified inputs 5812a, 5812b, 5812c, and optionally 5812d.

Figure 58C:
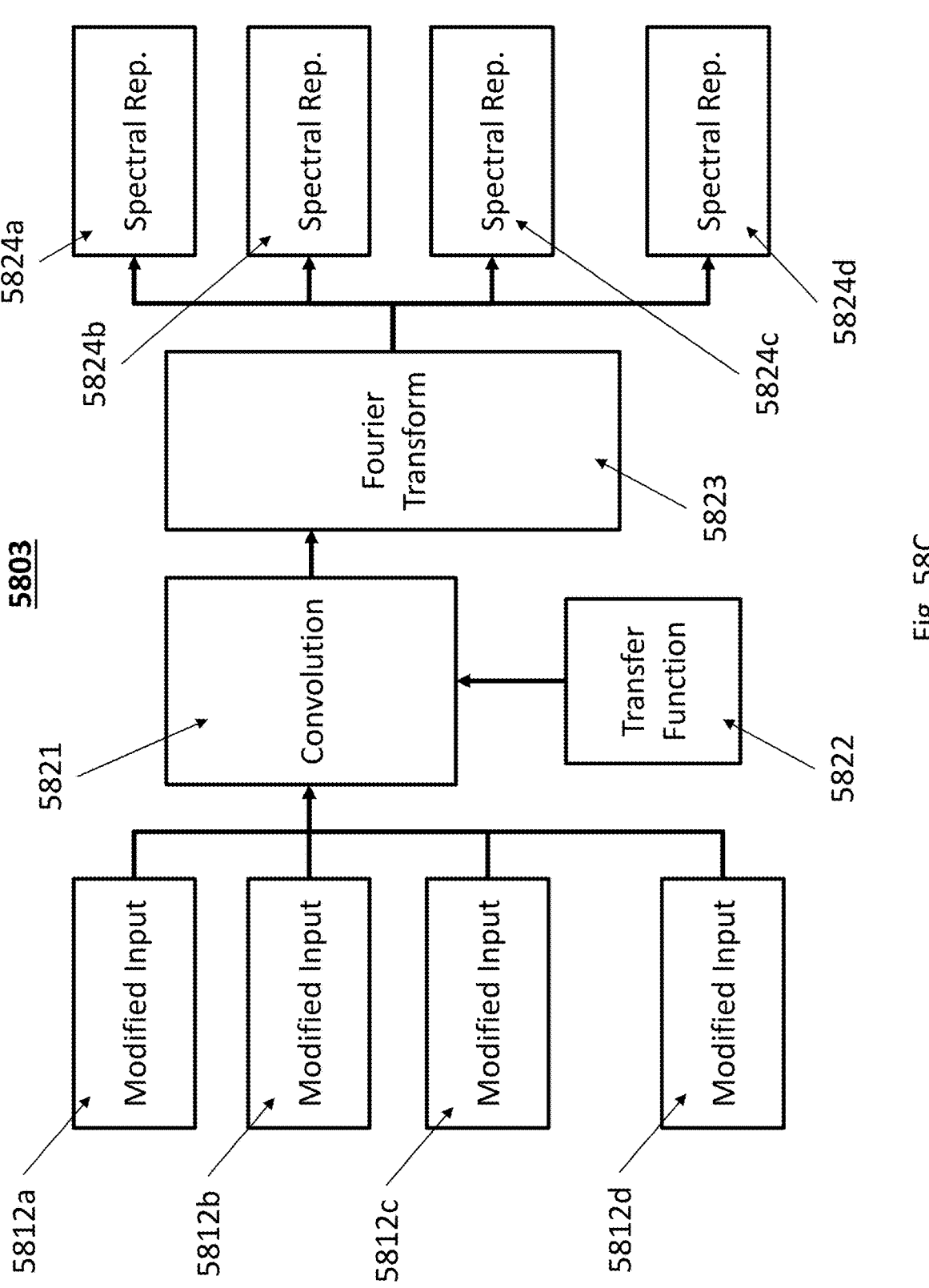

With reference to FIG. 58C, a detail view of the transform unit 5803 is shown. The transform unit takes as its inputs the modified inputs 5812a-5812c (and optionally 5812d) as produced in FIG. 58B. The modified inputs are each separately convolved 5821 with a transfer function 5822. As disclosed herein, the transfer function may be any transfer function where some regions of the transfer function are reversible (i.e. the input may be recovered from the output) and some regions of the transfer function are not reversible (i.e. it is not possible to recover the input from the output). The results of the convolution are then Fourier transformed 5823 to produce spectral representations 5824a-5824c (and optionally 5824d) of the transformed, masked inputs.

Figure 58D:
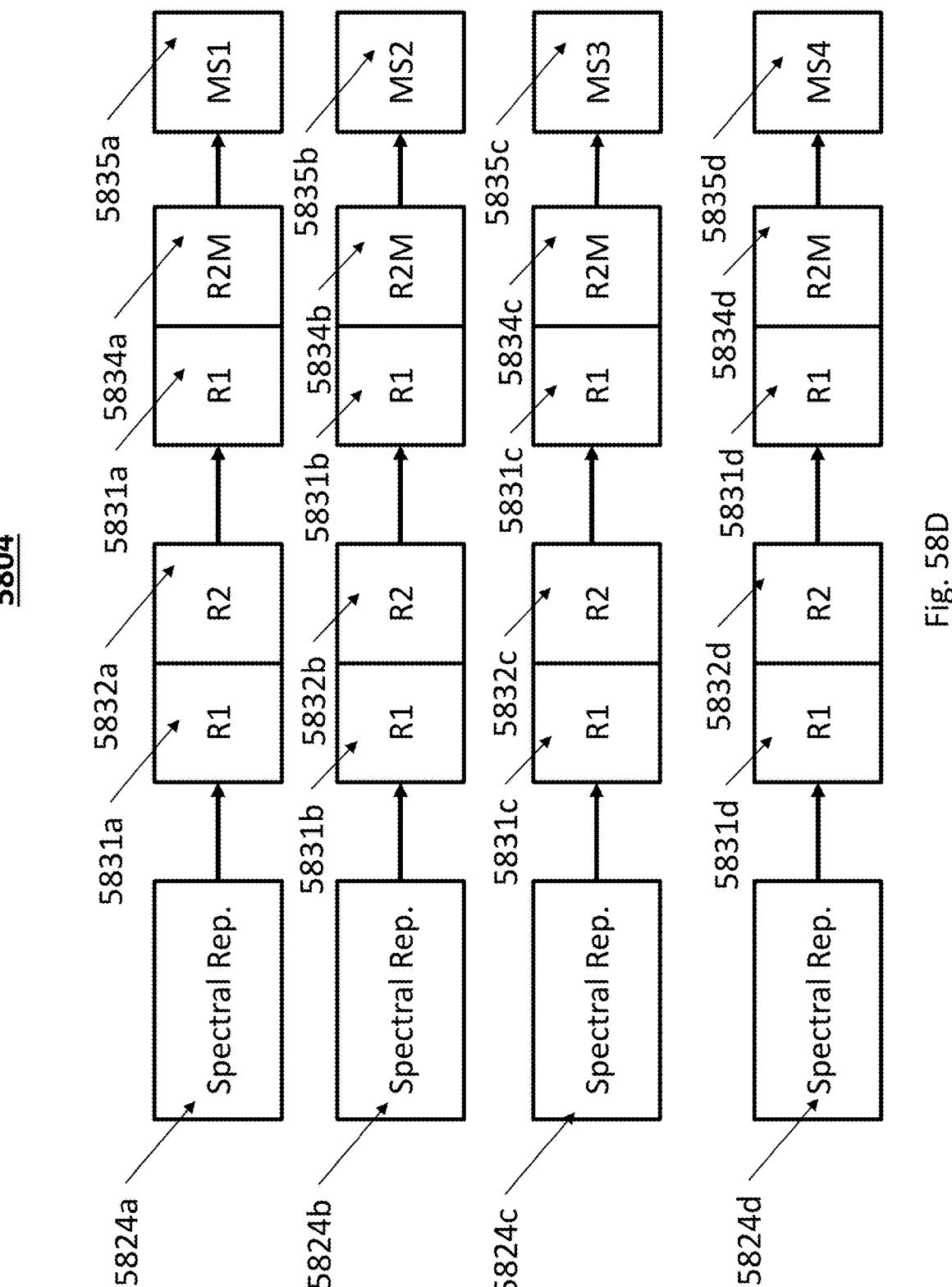

With reference to FIG. 58D, a detail view of the segmentation unit is 5804 is shown. The segmentation unit starts with the spectral representations 5824a-5824c (and optionally 5824d) and segments them each into at least two regions, denoted as R1 (5831a-5831d) and R2 (5832a-5832d). The first regions R1 are selected as the regions of the signal or image where the transfer function described above in the transform unit 5803 is reversible (i.e. the input may be recovered from the output) and the second regions R2 are selected as the regions of the signal or image where the transfer function described above is not reversible (i.e. it is not possible to recover the input from the output).

R1 and R2 as disclosed herein each comprise an amplitude and a phase. In the first iteration of the process of FIG. 58A, the amplitude and phase of R1 are kept the same. This initial amplitude and phase of R1 are also stored, for example in a buffer memory, for use in subsequent iterations. The amplitude of each R2 is replaced in the first iteration with the average amplitude of each R1, and the phase of each R2 (5834a-5834d) is chosen randomly between 0 and $2\pi$. In subsequent iterations of the process of FIG. 58A, the amplitude and phase of R1 are reloaded from the initial values stored during the first iteration, while the amplitude and phase of R2 are kept. These modified R1s and R2s are then provided as modified spectral representations 5835a-5835d.

Figure 58E:
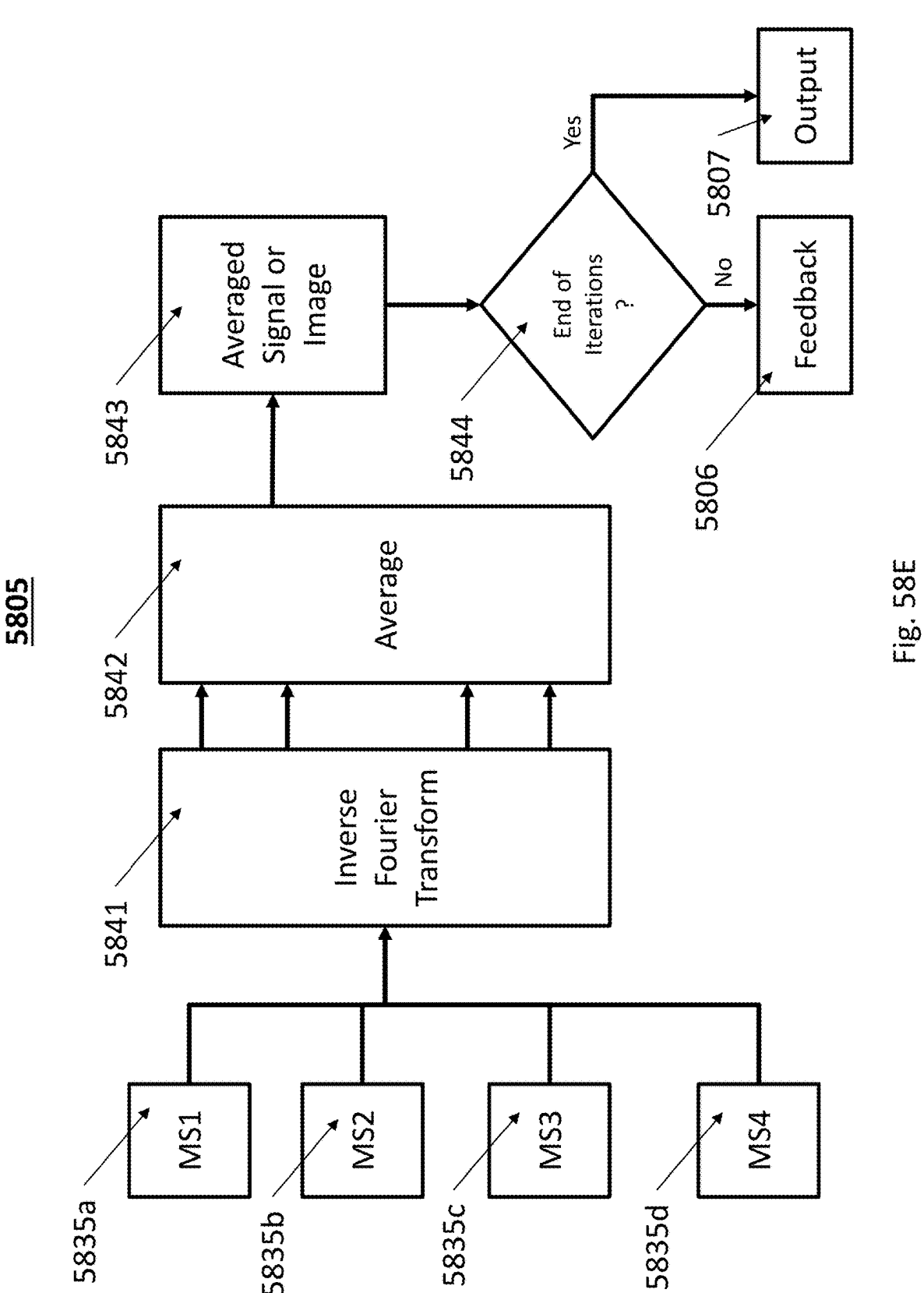

With reference to FIG. 58E, a detail view of the recovery unit 5805 is shown. The recovery unit 5805 takes as its inputs the modified spectral representations 5835a-5835d. The modified spectral representations are then each transformed via an inverse Fourier transform 5841, and then averaged 5842 to obtain a single averaged signal or image 5843. In some embodiments, this averaged signal or image 5843 is compared to the averaged signal or image obtained from the previous iteration to assess whether a difference between the averaged signal or image 5843 has converged sufficiently to provide an output. This comparison may take place in step 5844, or in some embodiments other alternative methods of determining convergence or determining the end of iterations may be used, for example a hard limit. If the process has reached the end of its iterations, the averaged signal or image may be provided as the output 5807. If, on the other hand, additional iterations are needed, the averaged signal or image may be provided as a feedback 5806, which is then fed back into the process as the input 5801 to perform another iteration.

Computing

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C#, Objective-C, Java, JavaScript, MATLAB, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G, 4G/LTE, or 5G networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

Figure 52:
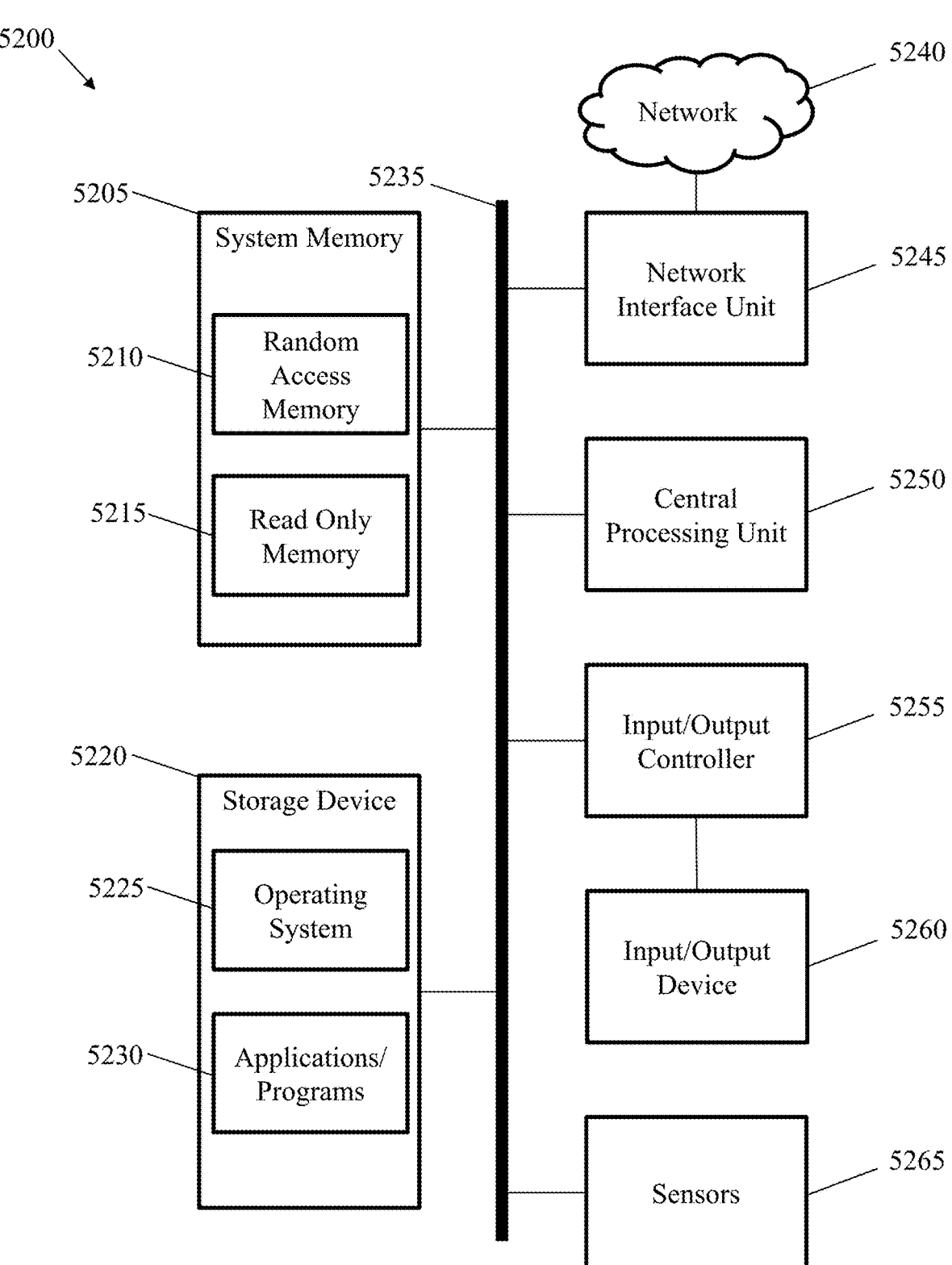
FIG. 52 is a diagram of a computer device on which the disclosed system may operate according to an aspect of the present invention.

FIG. 52 and the following discussion are intended to provide a brief, general description of a suitable computing environment in which the invention may be implemented. While the invention is described above in the general context of program modules that execute in conjunction with an application program that runs on an operating system on a computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 52 depicts an illustrative computer architecture for a computer 5200 for practicing the various embodiments of the invention. The computer architecture shown in FIG. 52 illustrates a conventional personal computer, including a central processing unit 5250 ("CPU"), a system memory 5205, including a random-access memory 5210 ("RAM") and a read-only memory ("ROM") 5215, and a system bus 5235 that couples the system memory 5205 to the CPU 5250. A basic input/output system containing the basic routines that help to transfer information between elements within the computer, such as during startup, is stored in the ROM 5215. The computer 5200 further includes a storage device 5220 for storing an operating system 5225, application/program 5230, and data.

The storage device 5220 is connected to the CPU 5250 through a storage controller (not shown) connected to the bus 5235. The storage device 5220 and its associated computer-readable media provide non-volatile storage for the computer 5200. Although the description of computer-readable media contained herein refers to a storage device, such as a hard disk or CD-ROM drive, it should be appreciated by those skilled in the art that computer-readable media can be any available media that can be accessed by the computer 5200.

By way of example, and not to be limiting, computer-readable media may comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer 5200 may operate in a networked environment using logical connections to remote computers through a network 5240, such as TCP/IP network such as the Internet or an intranet. The computer 5200 may connect to the network 5240 through a network interface unit 5245 connected to the bus 5235. It should be appreciated that the network interface unit 5245 may also be utilized to connect to other types of networks and remote computer systems.

The computer 5200 may also include an input/output controller 5255 for receiving and processing input from a number of input/output devices 5260, including a keyboard, a mouse, a touchscreen, a camera, a microphone, a controller, a joystick, or other type of input device. Similarly, the input/output controller 5255 may provide output to a display screen, a printer, a speaker, or other type of output device. The computer 5200 can connect to the input/output device 5260 via a wired connection including, but not limited to, fiber optic, Ethernet, or copper wire or wireless means including, but not limited to, Wi-Fi, Bluetooth, Near-Field Communication (NFC), infrared, or other suitable wired or wireless connections.

As mentioned briefly above, a number of program modules and data files may be stored in the storage device 5220 and/or RAM 5210 of the computer 5200, including an operating system 5225 suitable for controlling the operation of a networked computer. The storage device 5220 and RAM 5210 may also store one or more applications/programs 5230. In particular, the storage device 5220 and RAM 5210 may store an application/program 5230 for providing a variety of functionalities to a user. For instance, the application/program 5230 may comprise many types of programs such as a word processing application, a spreadsheet application, a desktop publishing application, a database application, a gaming application, internet browsing application, electronic mail application, messaging application, and the like. According to an embodiment of the present invention, the application/program 5230 comprises a multiple functionality software application for providing word processing functionality, slide presentation functionality, spreadsheet functionality, database functionality and the like.

The computer 5200 in some embodiments can include a variety of sensors 5265 for monitoring the environment surrounding and the environment internal to the computer 5200. These sensors 5265 can include a Global Positioning System (GPS) sensor, a photosensitive sensor, a gyroscope, a magnetometer, thermometer, a proximity sensor, an accelerometer, a microphone, biometric sensor, barometer, humidity sensor, radiation sensor, or any other suitable sensor.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the system and method of the present invention. The following working examples therefore, specifically point out the exemplary embodiments of the present invention, and are not to be construed as limiting in any way the remainder of the disclosure.

Digital Experiments with Incoherent Totagraphy

Figure 2:
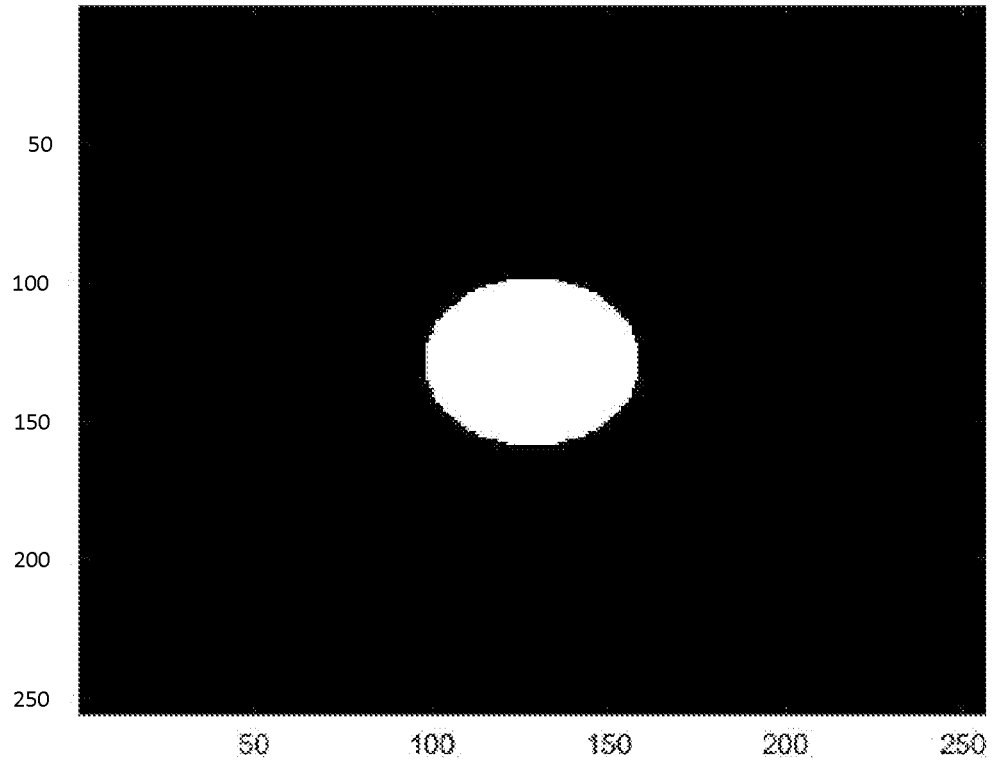
FIG. 2 displays a coherent transfer function of the optical system used.
Figure 3:
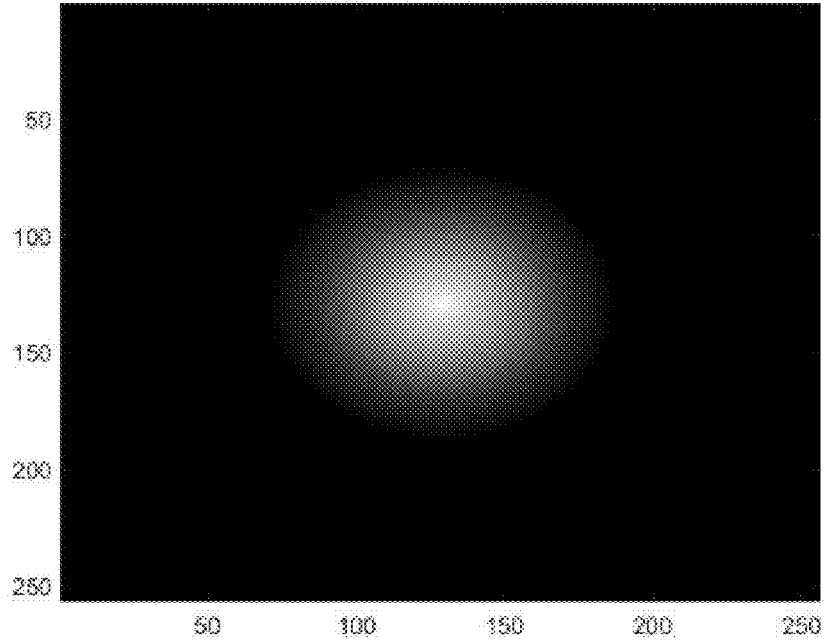
FIG. 3 displays an optical transfer function (OTF) of the optical system used.
Figure 4:
FIG. 4 displays the original Lena image as system input.
Figure 12:
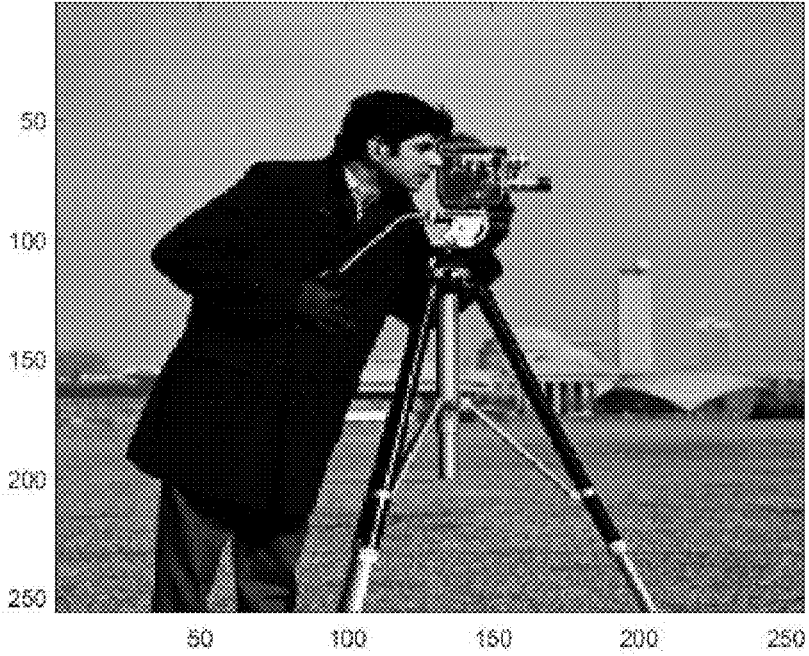
FIG. 12 displays the original Cameraman image as system input.

The method discussed above was experimented with two input images. The first image was the Lena image (FIG. 4). The second image was the Cameraman image (FIG. 12). The optical system used was chosen with a numerical aperture (NA) equal to 0.15. Its coherent transfer function is shown in FIG. 2. The corresponding optical transfer function is shown in FIG. 3. In the experiments, one transparent mask and 9 pairs of complimentary unipolar binary masks were used.

Experimental Results with the Lena Image

Figure 5:
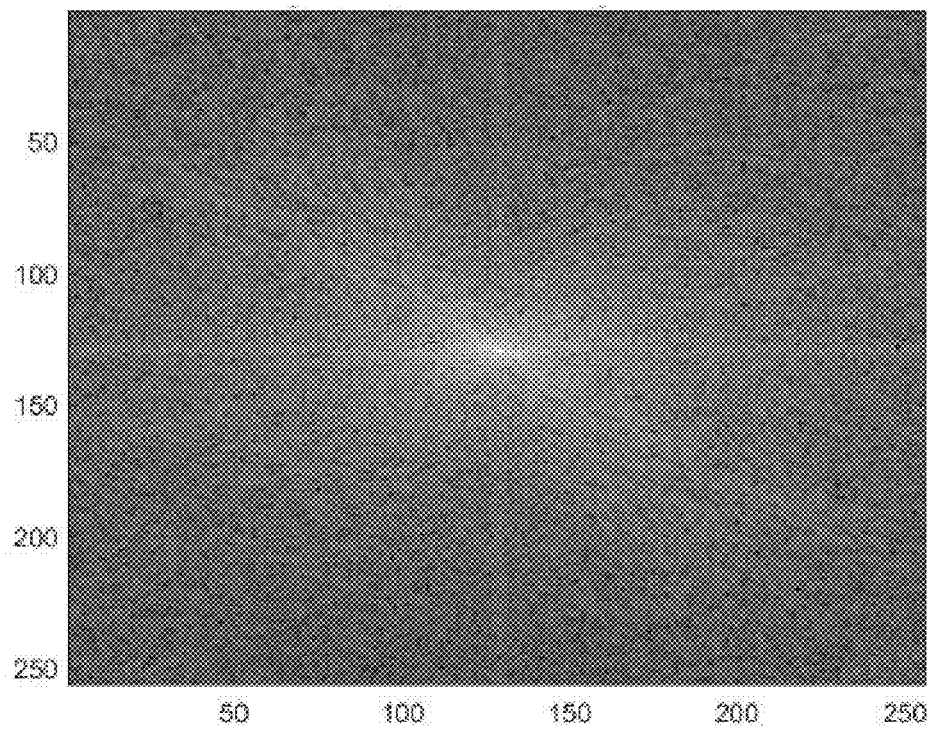
FIG. 5 displays for the original log absolute spectrum of the Lena image.
Figure 6:
FIG. 6 displays the lowpass image due to the transparent window.
Figure 7:
FIG. 7 displays the deconvolved lowpass image by using H'(·).
Figure 8:
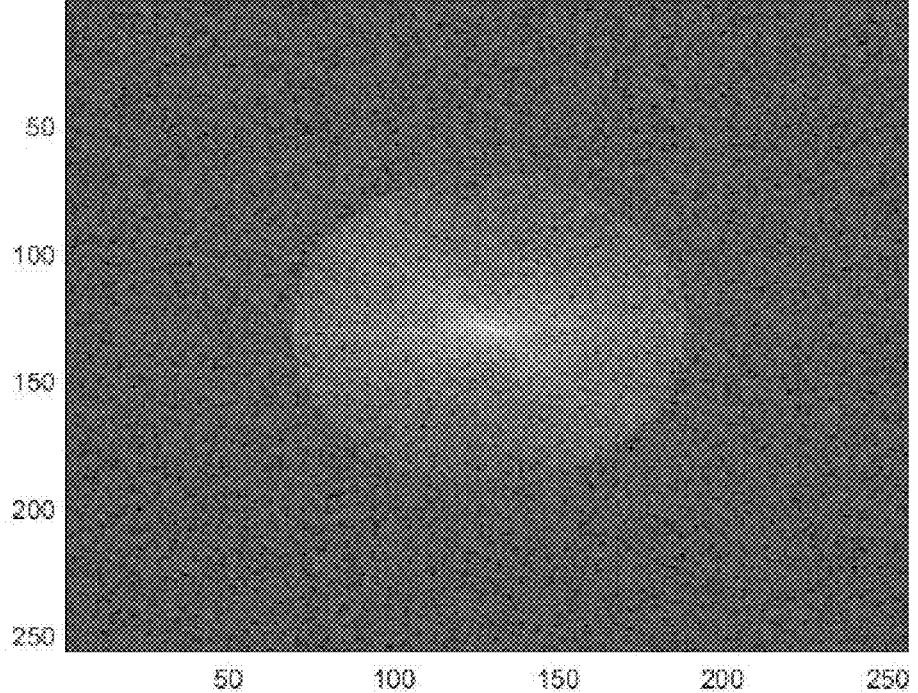
FIG. 8 displays the log absolute spectrum of deconvolved lowpass image using H'(·).

FIG. 4 shows the original Lena image. FIG. 5 shows the corresponding log absolute spectral image. The lowpass image when using the transparent mask is shown in FIG. 6. The deconvolved lowpass image by using H'(·) and Eq. (5) is shown in FIG. 7. The result is not satisfactory. The spectrum of deconvolved lowpass image by using H'(·) in FIG. 8 reconfirms this conclusion.

Figure 9:
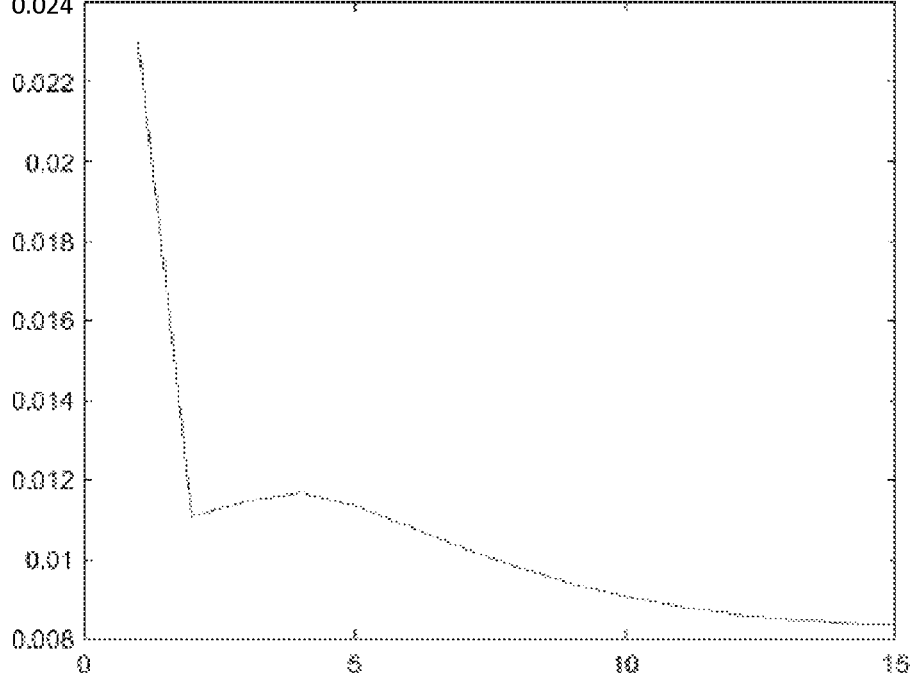
FIG. 9 shows the results for the mean square error versus iteration in the recovery of the Lena image.
Figure 10:
FIG. 10 displays the recovered Lena image.
Figure 11:
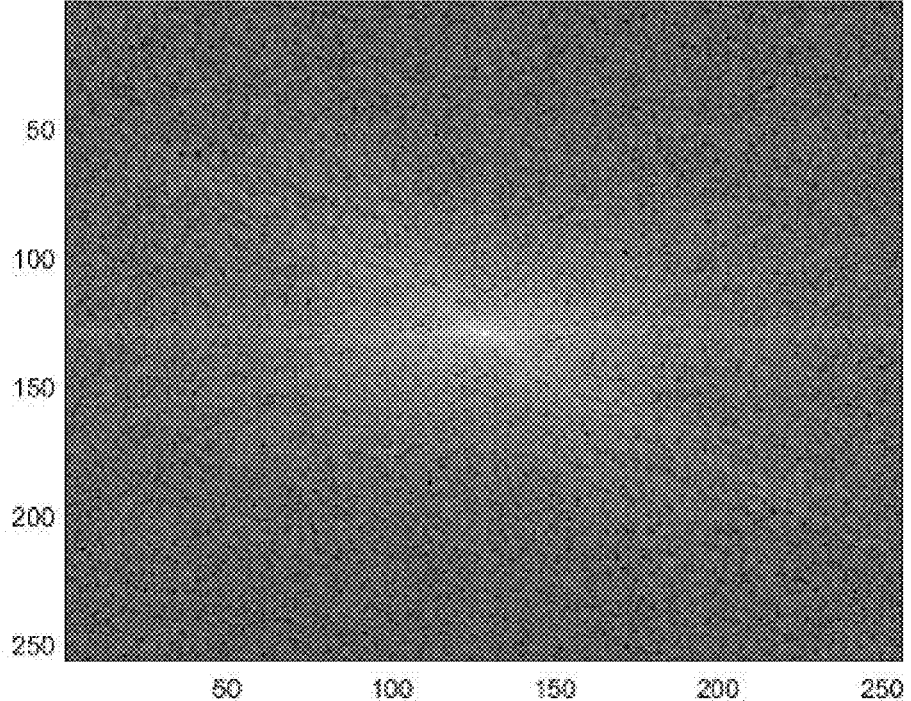
FIG. 11 displays the spectrum of the recovered Lena image.

Next the MPIR method is completed. FIG. 9 shows the mean square error versus iteration in the recovery of the Lena image. FIG. 10 shows the recovered Lena image. It is observed that the quality of the recovered image is excellent. FIG. 11 shows the log absolute spectrum of the recovered Lena image. It is observed that it is essentially the same as the original log absolute spectrum of the Lena image in FIG. 5. Please see FIG. 55 for the flowchart of the MPIR method.

Experimental Results with the Cameraman Image

Figure 13:
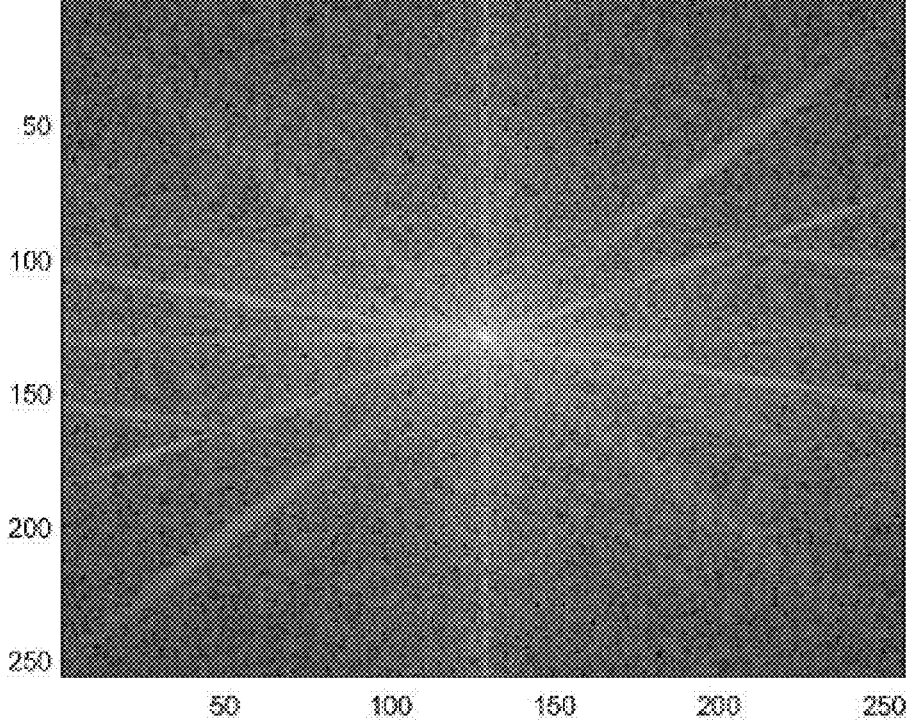
FIG. 13 displays the original log absolute spectrum of the Cameraman image.
Figure 14:
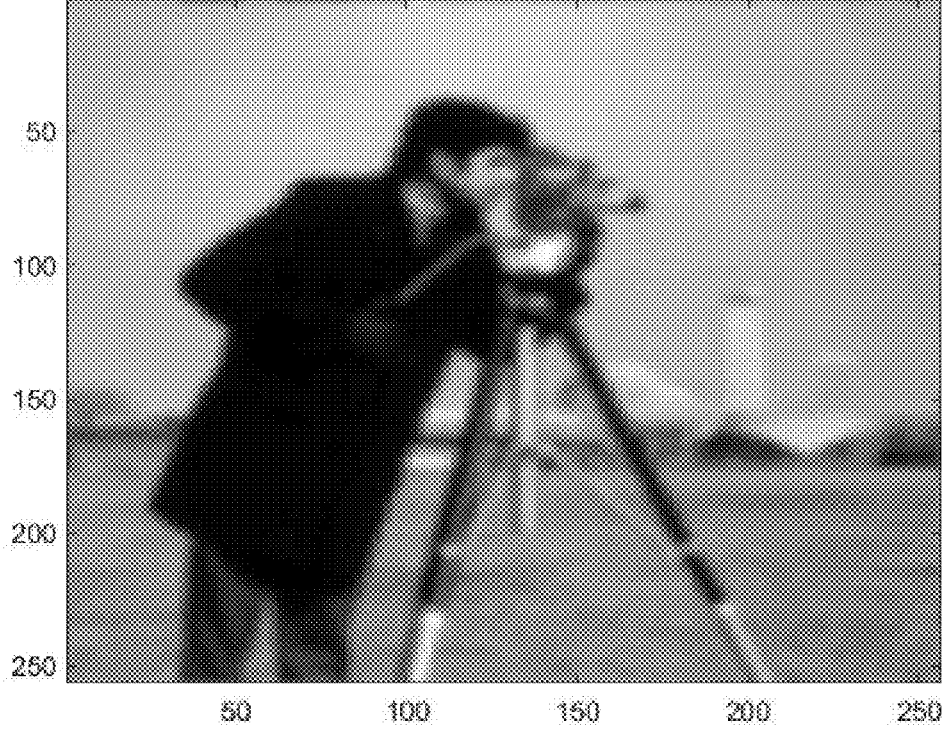
FIG. 14 displays the lowpass image due to the transparent window.
Figure 15:
FIG. 15 displays the deconvolved lowpass image by using H'(·).
Figure 16:
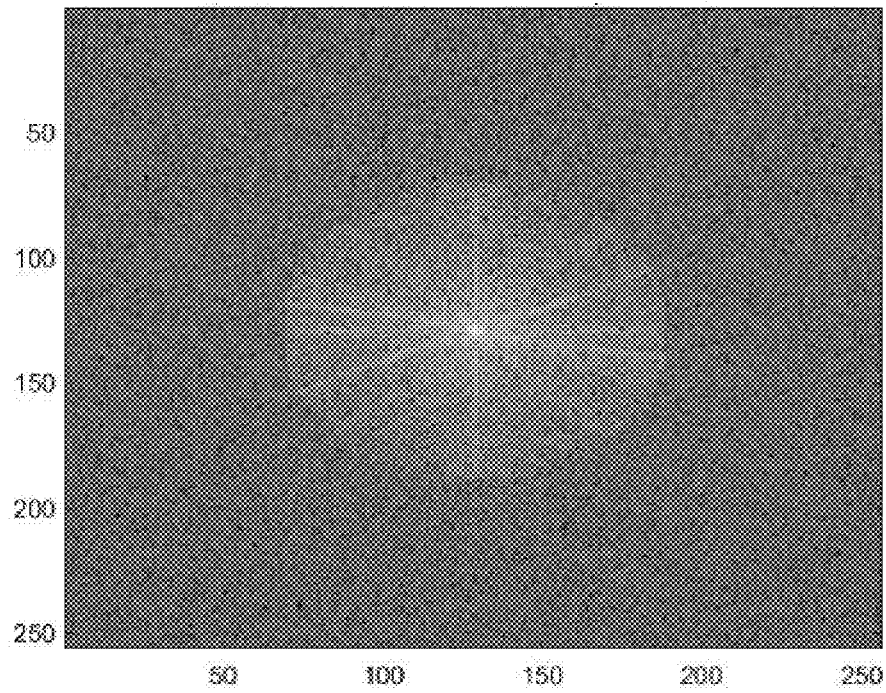
FIG. 16 displays the log absolute spectrum of deconvolved lowpass image using H'(·).

FIG. 12 shows the original Cameraman image. FIG. 13 shows the corresponding log absolute spectral image. The lowpass image when using the transparent mask is shown in FIG. 14. The deconvolved lowpass image by using H'(·) and Eq. (5) is shown in FIG. 15. The result is not satisfactory. The spectrum of deconvolved lowpass image by using H'(·) in FIG. 16 reconfirms this conclusion.

Figure 17:
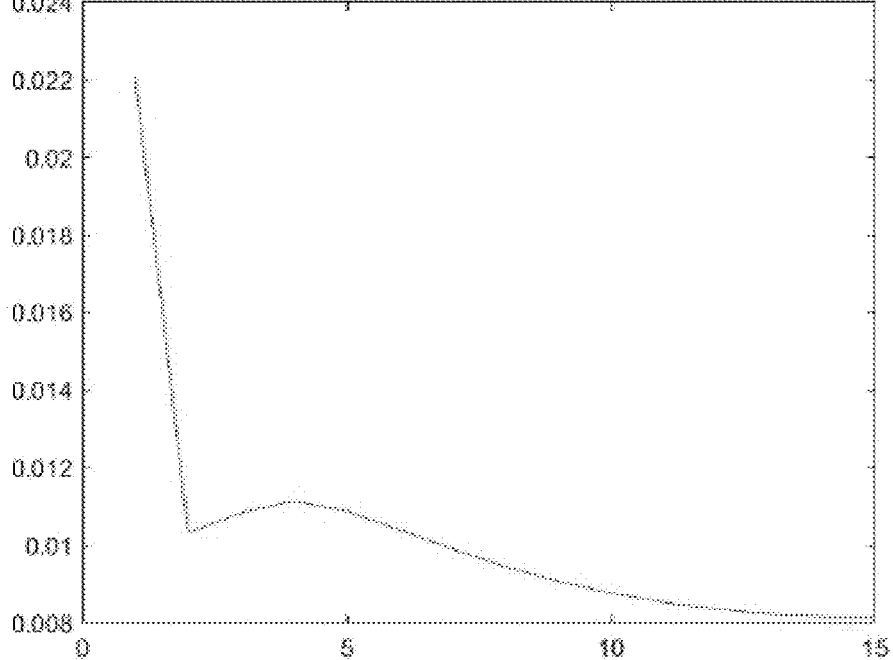
FIG. 17 shows the results for the mean square error versus iteration in the recovery of the Cameraman image.
Figure 18:
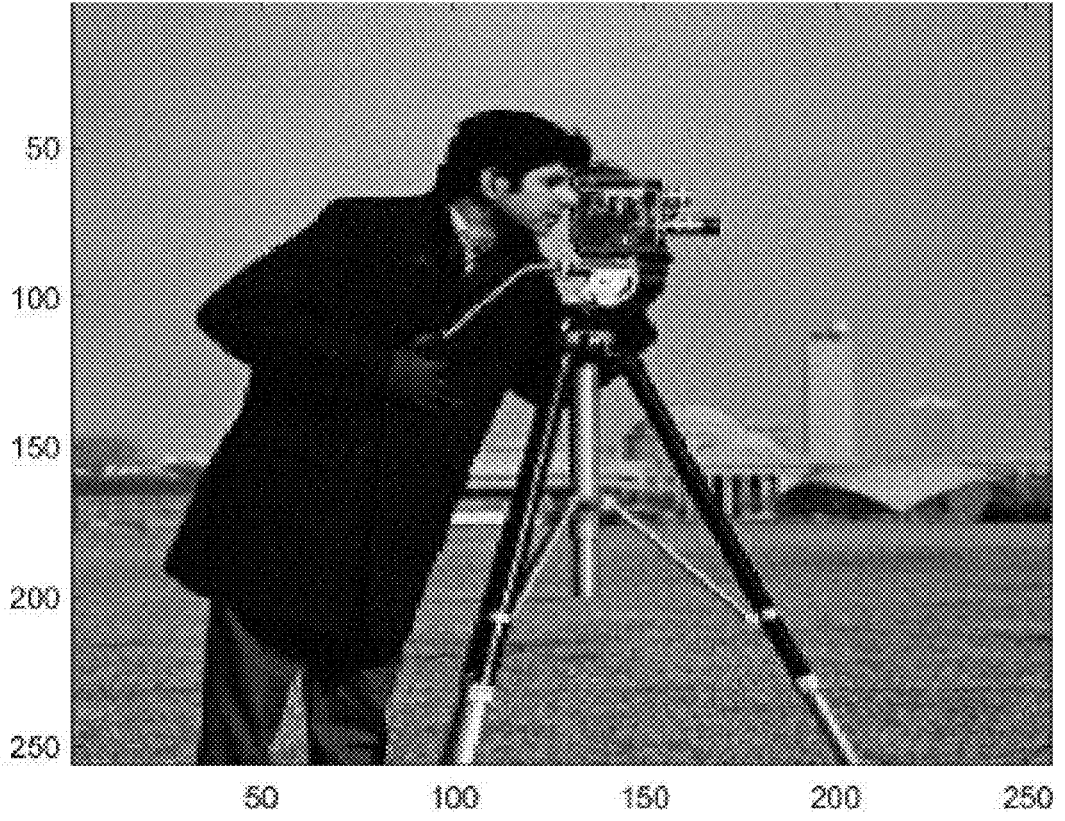
FIG. 18 displays the recovered Cameraman image.
Figure 19:
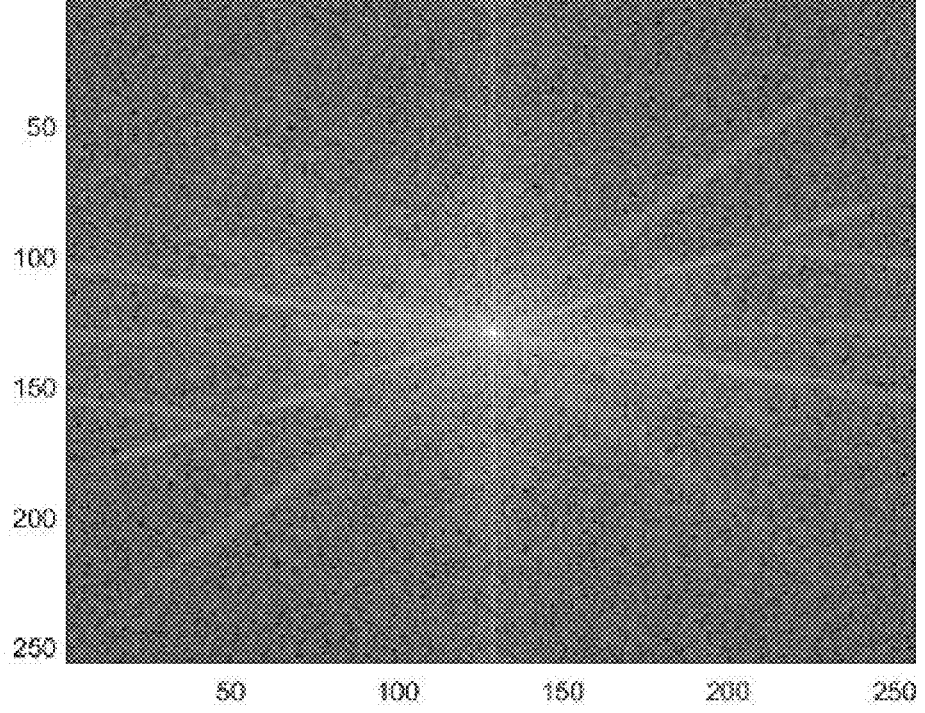
FIG. 19 displays the log absolute spectrum of the recovered Cameraman image.

Next the MPIR method is completed. FIG. 17 shows the mean square error versus iteration in the recovery of the Cameraman image. FIG. 18 shows the recovered Camera-man image. It is observed that the quality of the recovered image is excellent. FIG. 19 shows the log absolute spectrum of the recovered Cameraman image. It is observed that it is essentially the same as the original log absolute spectrum of the Cameraman image in FIG. 13.

Digital Experiments with FPP

The method of FPP was experimentally compared with the method of IT using the same input images, namely the Lena image, and the Cameraman image. The optical system used was also the same with a numerical aperture (NA) equal to 0.15. Its properties are shown in FIG. 2 and FIG. 3. For fair comparison, the same number of masks were used, namely 19 masks with speckle values as discussed in the section Fourier Ptychographic Photography.

Experimental Results with the Lena Image

Figure 20:
FIG. 20 displays the recovered Lena image with the FPP method.
Figure 21:
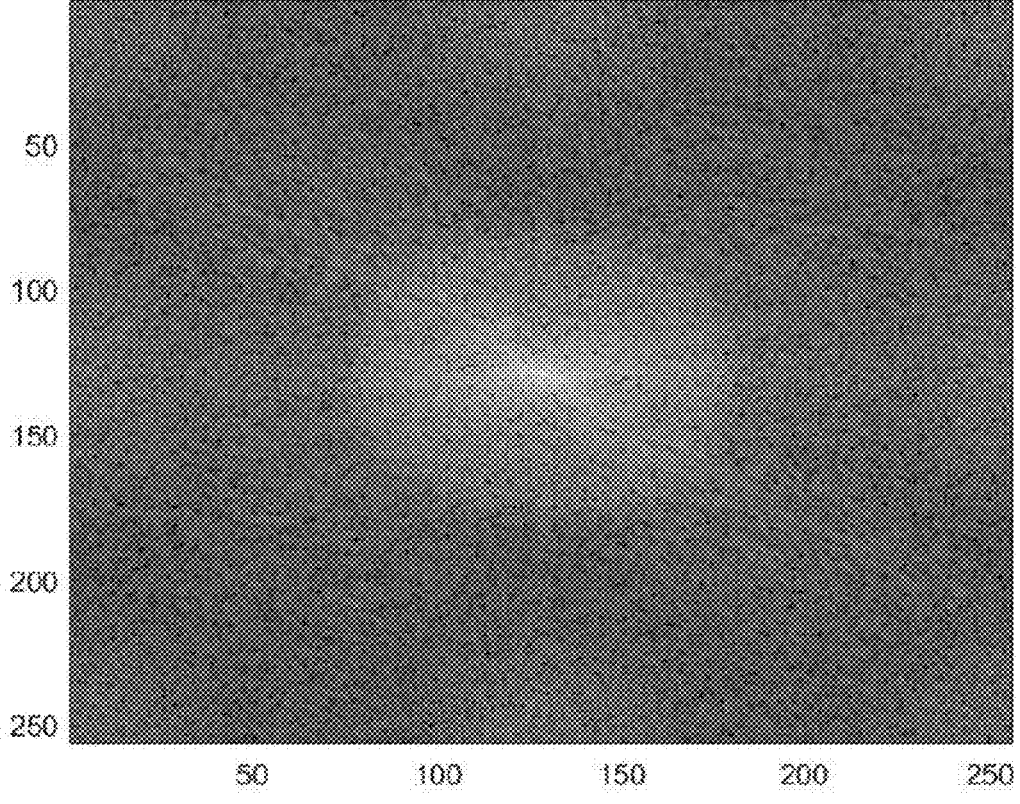
FIG. 21 displays the spectrum of the recovered Lena image with the FPP method.

Next the MPIR method is completed. FIG. 20 shows the recovered Lena image. It is observed that the quality is reasonable, but not as good as the quality in FIG. 10 obtained with IT. FIG. 21 shows the log absolute spectrum of the recovered Lena image. It is observed that it is not quite the same as the original log absolute spectrum of the Lena image in FIG. 5, which was matched in FIG. 11 with IT.

Experimental Results with the Cameraman Image

Figure 22:
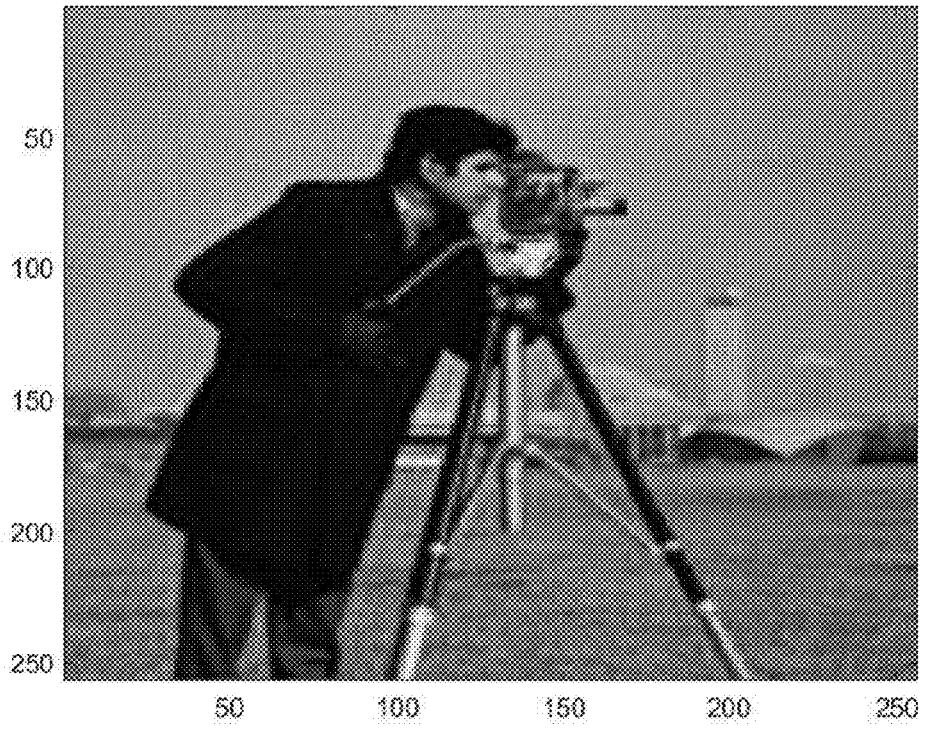
FIG. 22 displays the recovered Cameraman image with the FPP method.
Figure 23:
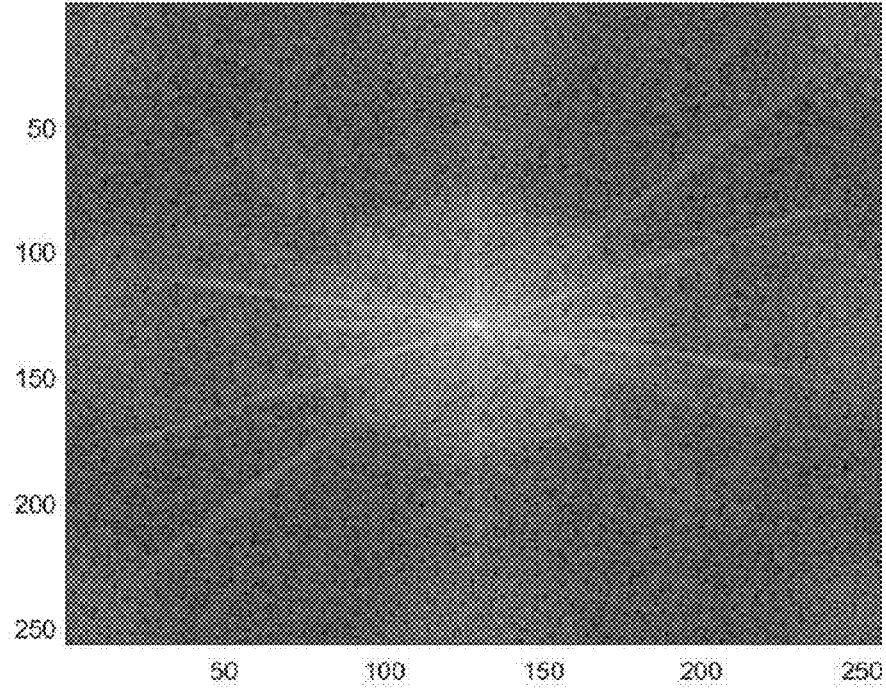
FIG. 23 displays the log absolute spectrum of the recovered Cameraman image with the FPP method.

FIG. 22 shows the original Cameraman image. It is observed that the quality is reasonable, but not as good as the quality in FIG. 13 obtained with IT. FIG. 23 shows the log absolute spectrum of the recovered Cameraman image. It is observed that it is not quite the same as the original log absolute spectrum of the Cameraman image in FIG. 13, which was matched in FIG. 19 with IT.

Incompletely Known Optical Transfer Functions

Figure 24:
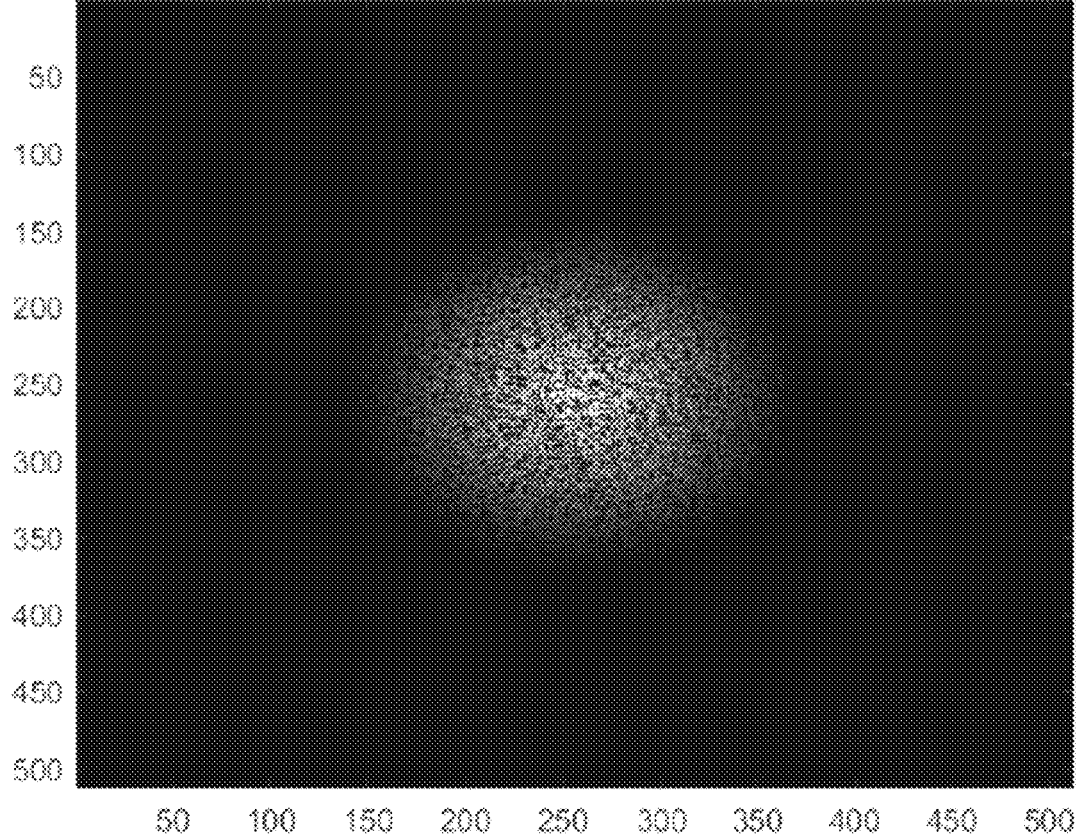
FIG. 24 displays the OTF with zeroed (black) pixels resulting in missing information.
Figure 25:
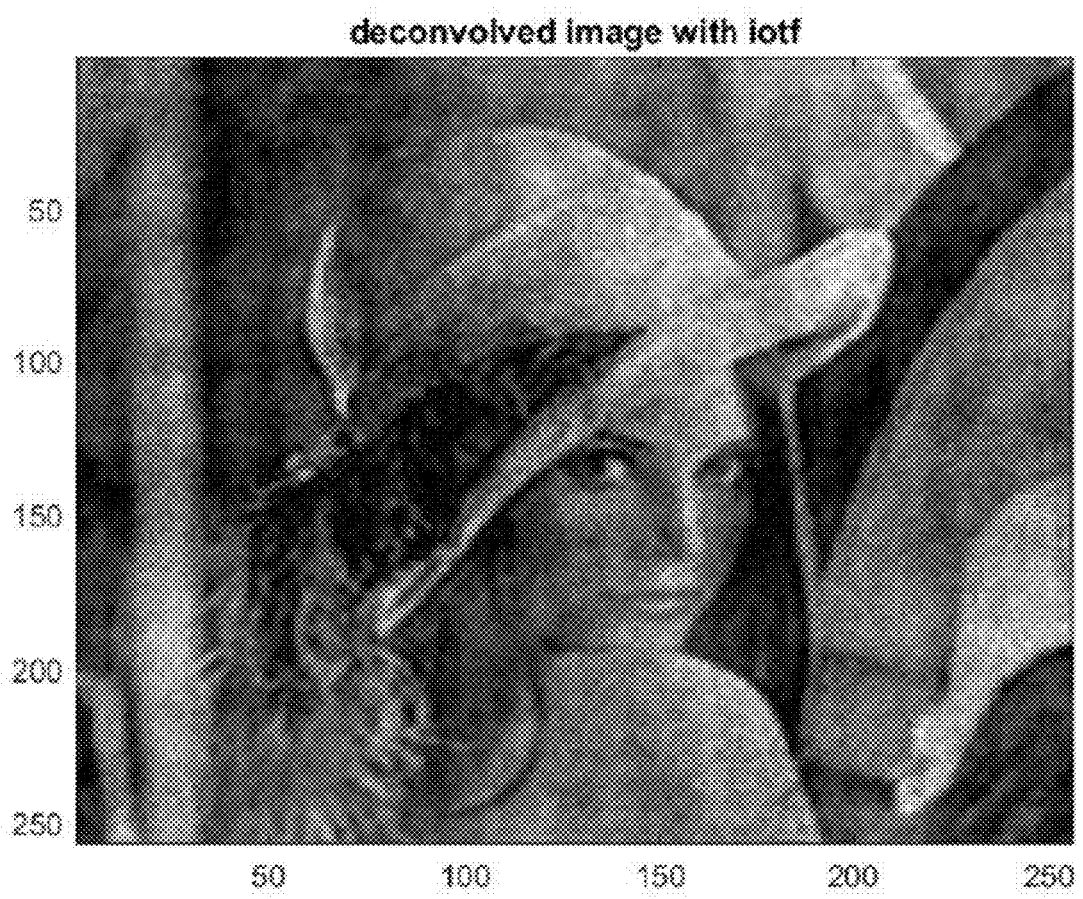
FIG. 25 displays the recovered Lena image with the known part of the OTF by inverse filtering.
Figure 26:
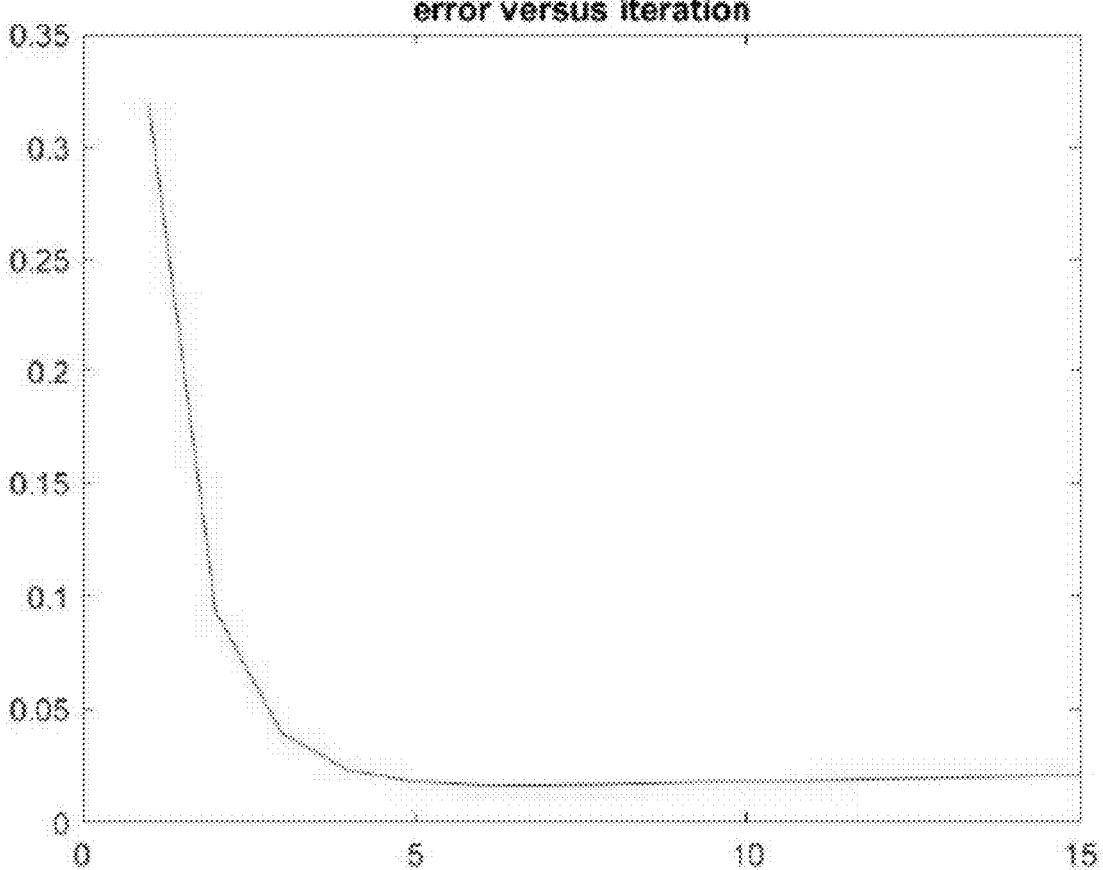
FIG. 26 shows the results for the mean square error versus iteration in the recovery of the Lena image when OTF is partially known.
Figure 27:
FIG. 27 displays the recovered Lena image when OTF is partially known.
Figure 28:
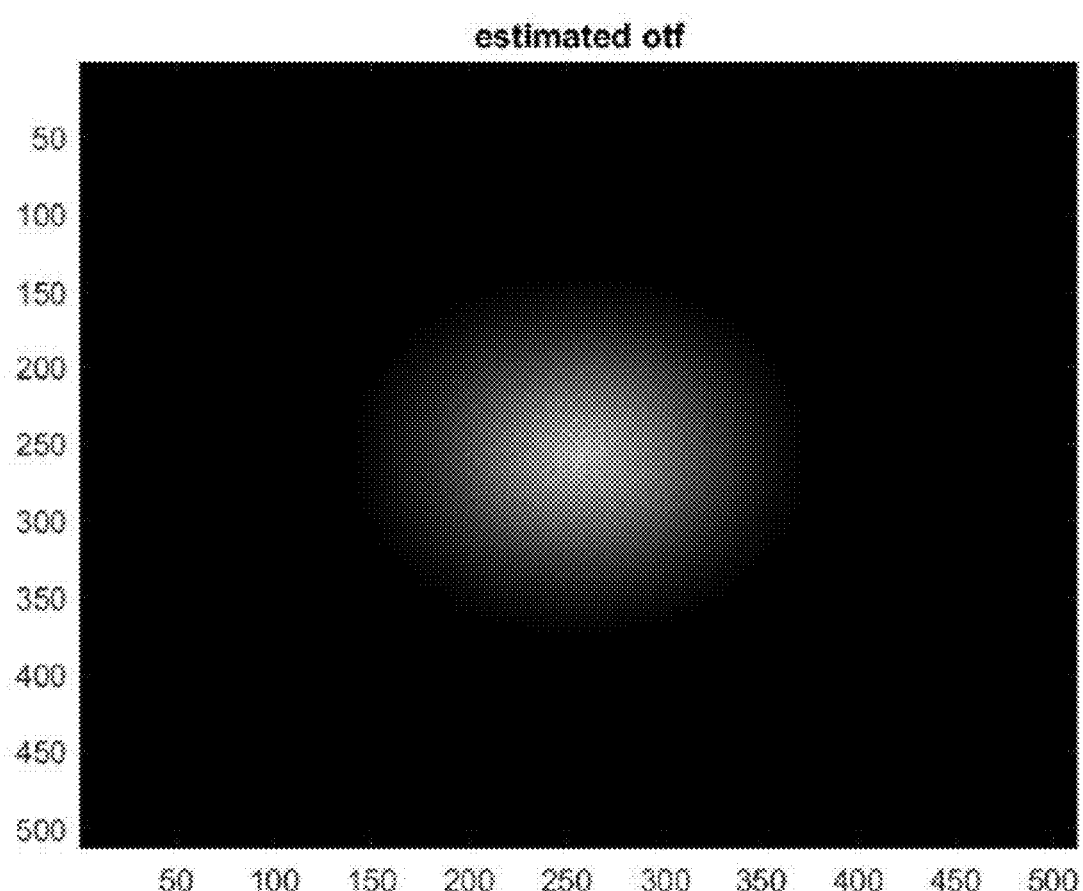
FIG. 28 displays the estimated OTF after the recovery of the input Lena image.

In order to find out how the IT method works when parts of the OTF are unknown or incorrectly known, zeroes are introduced on the OTF plane. The Lena image is used in the experiments. The number of pixels on the OTF plane is $512 \times 512 = 262,144$. The number of zeroes is controlled by a fraction number r=0.1, 0.2, . . . , 0.9. In other words, r indicates the fraction of pixels of the OTF which are zeroed. For example, when r=0.3, about 117750 zeroes are created, corresponding to the missing information at these OTF pixels. The same experiment with NA=0.15 illustrated in FIG. 4 to FIG. 10 was run, with less information on OTF due to the missing pixels corresponding to the zeroed pixels. FIG. 24 shows the OTF with zeroed (black) pixels corresponding to missing information. FIG. 25 shows the recovered Lena image with only the known part of the OTF by inverse filtering. It is observed that the result is not satisfactory. FIG. 26 shows the mean square error versus iteration in the recovery of the Lena image with the IT iterative method when OTF was partially known. FIG. 27 shows the recovered Lena image in this case. It is observed to be quite good. This result shows that the IT iterative method is effective in recovering the original image with sufficient accuracy as long as the missing OTF information is not too excessive. Once the recovered input image is available, the true OTF can be estimated by dividing the spectrum of the estimated image by the spectrum of the measured output image. Since a number of output images corresponding to the masked input images are available, this process can be carried out with all the available input-output pairs, and the results can be averaged as the estimate of the true OTF. FIG. 28 shows the true OTF estimate obtained. This actually corresponds to linear system identification when the system OTF is partially known.

Digital Experiments with an Audio Signal

Figure 29:
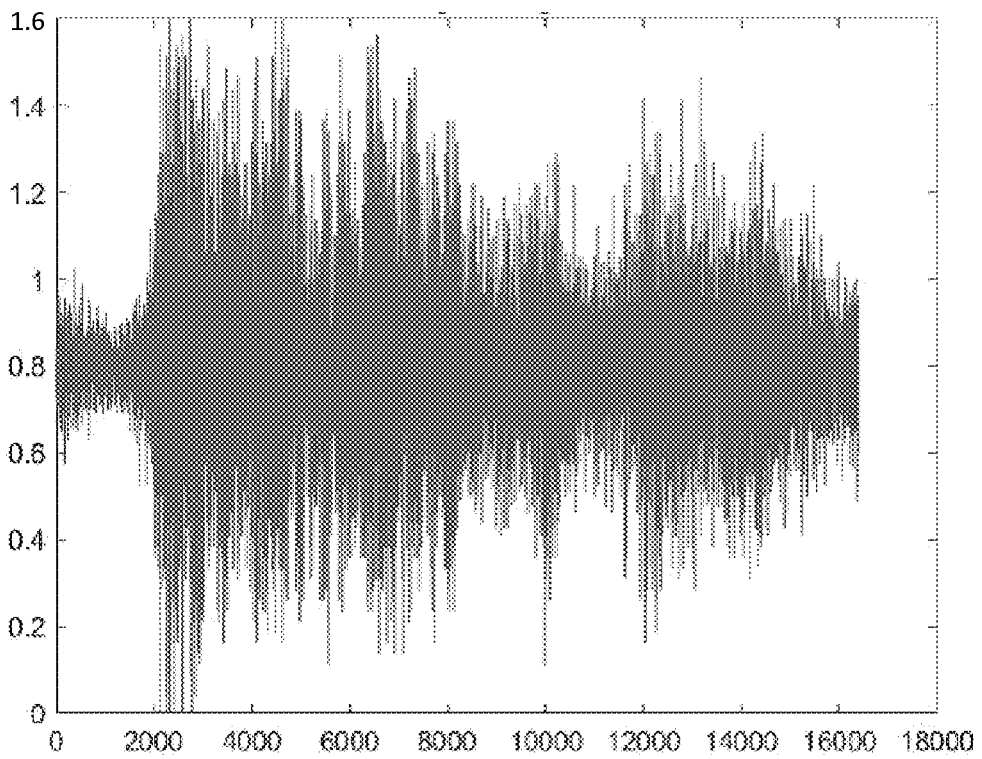
FIG. 29 displays the original audio signal 'hallelujah'.
Figure 30:
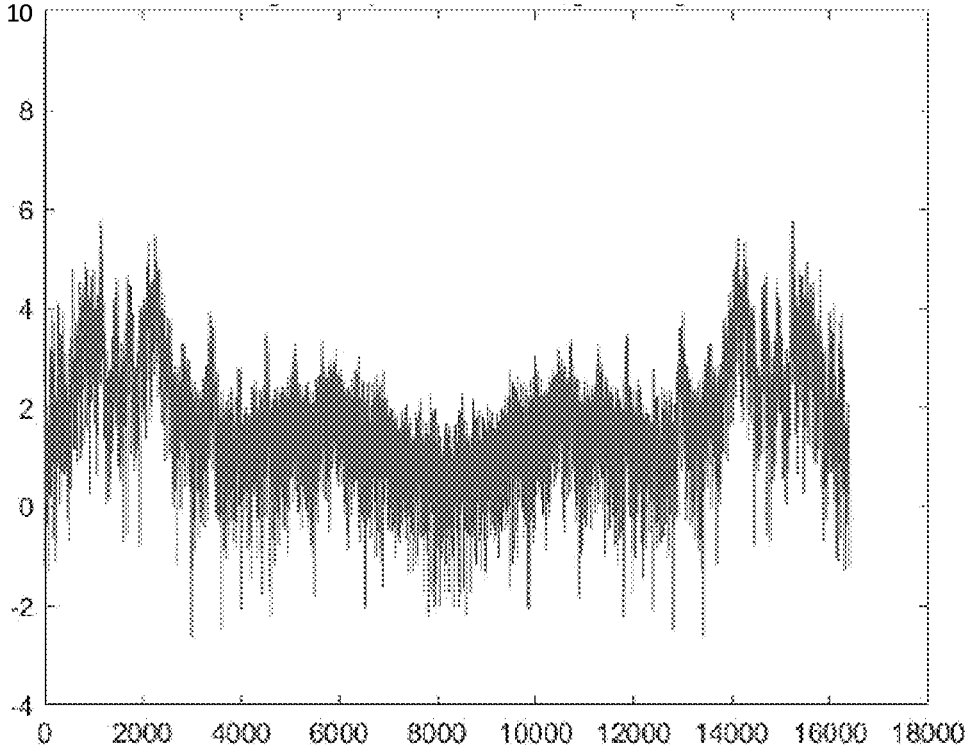
FIG. 30 displays the log absolute spectrum of the original signal.
Figure 31:
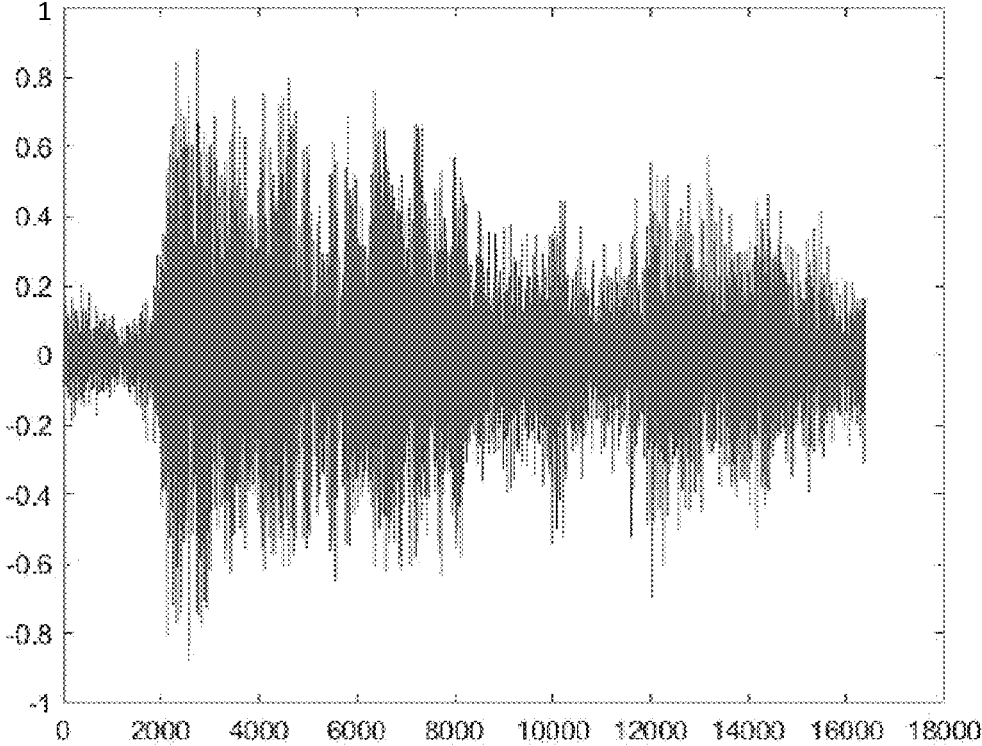
FIG. 31 displays a lowpass filtered signal.
Figure 32:
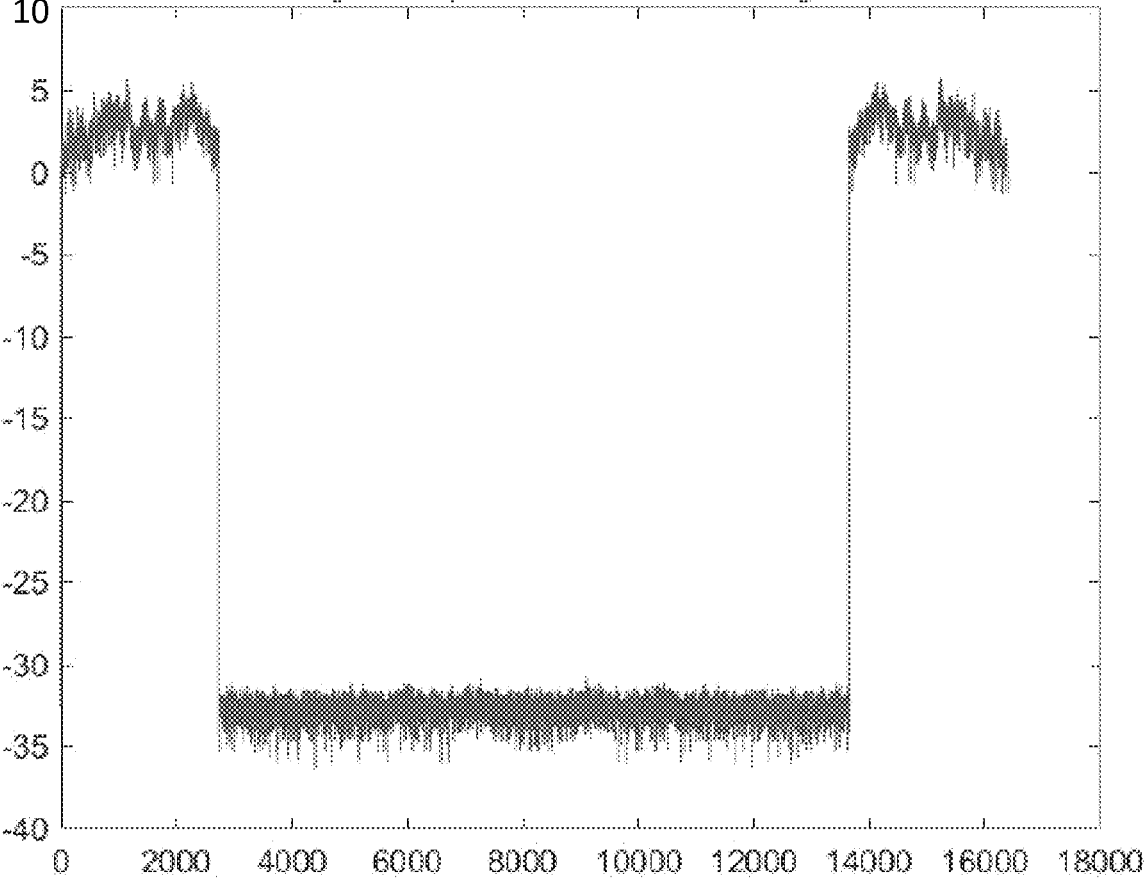
FIG. 32 displays the log absolute spectrum of the lowpass signal.
Figure 33:
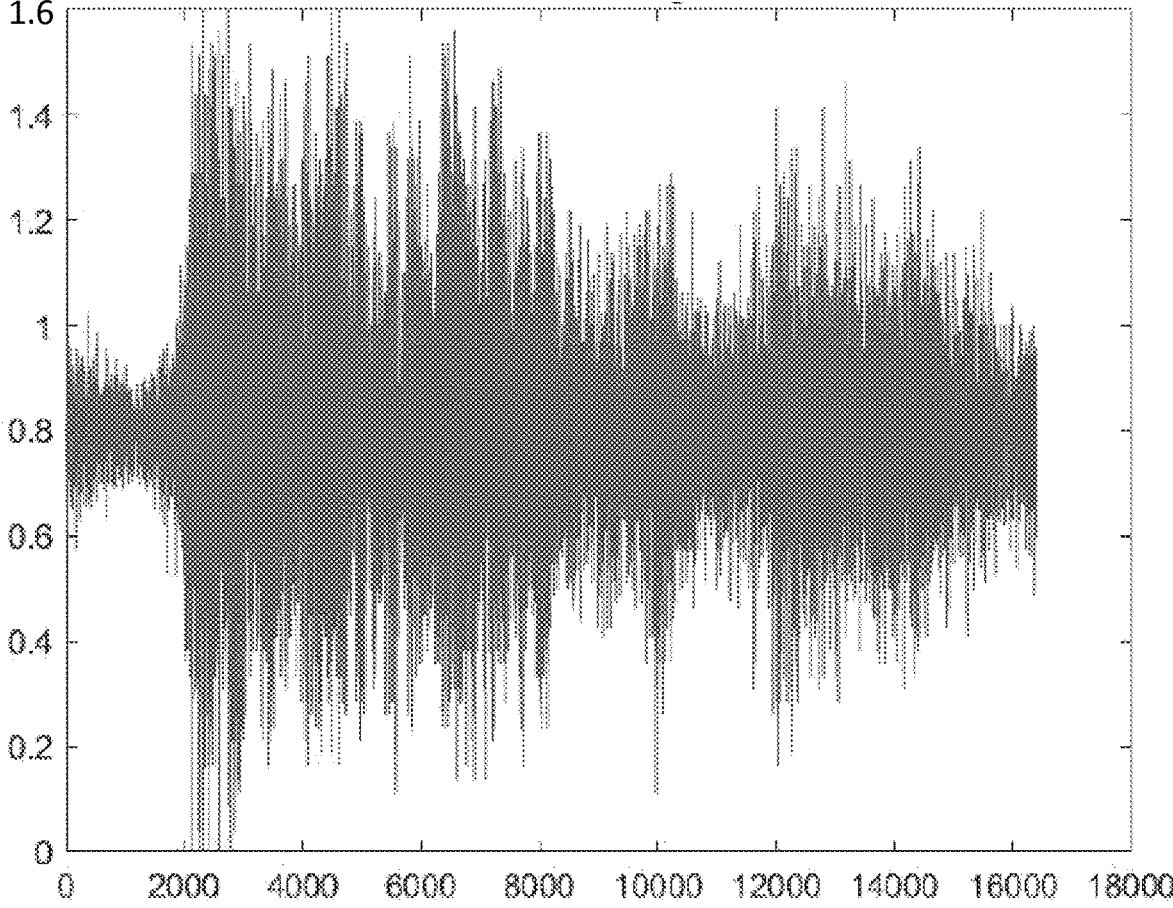
FIG. 33 displays the recovered audio signal 'hallelujah'.
Figure 34:
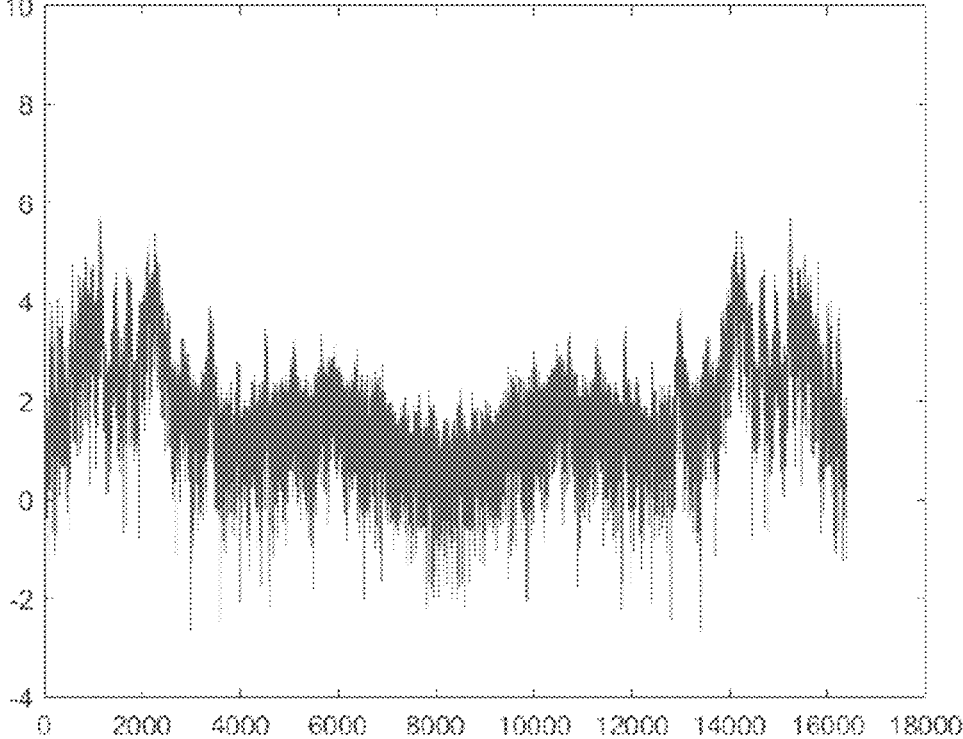
FIG. 34 displays the log absolute spectrum of the recovered signal.

The digital experiments were carried out with the audio signal shown in FIG. 29. It corresponds to the word 'halle-lujah'. FIG. 30 shows the log absolute spectrum of the original signal. FIG. 31 shows the lowpass signal generated from the original signal by using convolution with FFT, and a lowpass transfer function. FIG. 32 shows the log absolute spectrum of the lowpass signal. FIG. 32 appears this way due to the use of DFT (FFT) which shows low frequencies at the beginning and the end, and high frequencies in the middle. FIG. 33 shows the recovered audio signal 'hallelu-jah' by using the 1-D IT method. It is observed to be essentially the same as the original signal. FIG. 34 shows the log absolute spectrum of the recovered signal.

Discussion of Results 1

The experimental results carried out with two images resulted in considerably better image recovery with 2-D IT as compared to FPP. The results were very similar when the OTF was partially known as long as the missing information was not too excessive. Once the input image was estimated, the true OTF was also estimated. This process corresponds to linear system identification when the system OTF is partially known.

1-D IT is similar to 2-D IT by replacing 2-D variables by 1-D variables. Experiments with an audio signal which was lowpass filtered resulted in perfect signal recovery by using 1-D IT.

Digital Experiments with Coherent Totagraphy 2

Figure 37:
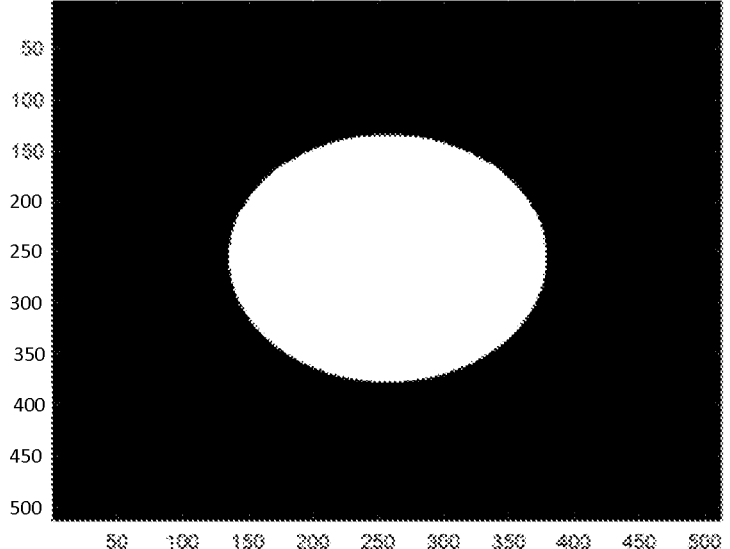
FIG. 37 displays a coherent transfer function of the optical system used.

The method discussed above was experimented with the Lena image. The optical system used was chosen with a numerical aperture (NA) equal to 0.20. Its coherent transfer function is shown in FIG. 37.

Figure 56:
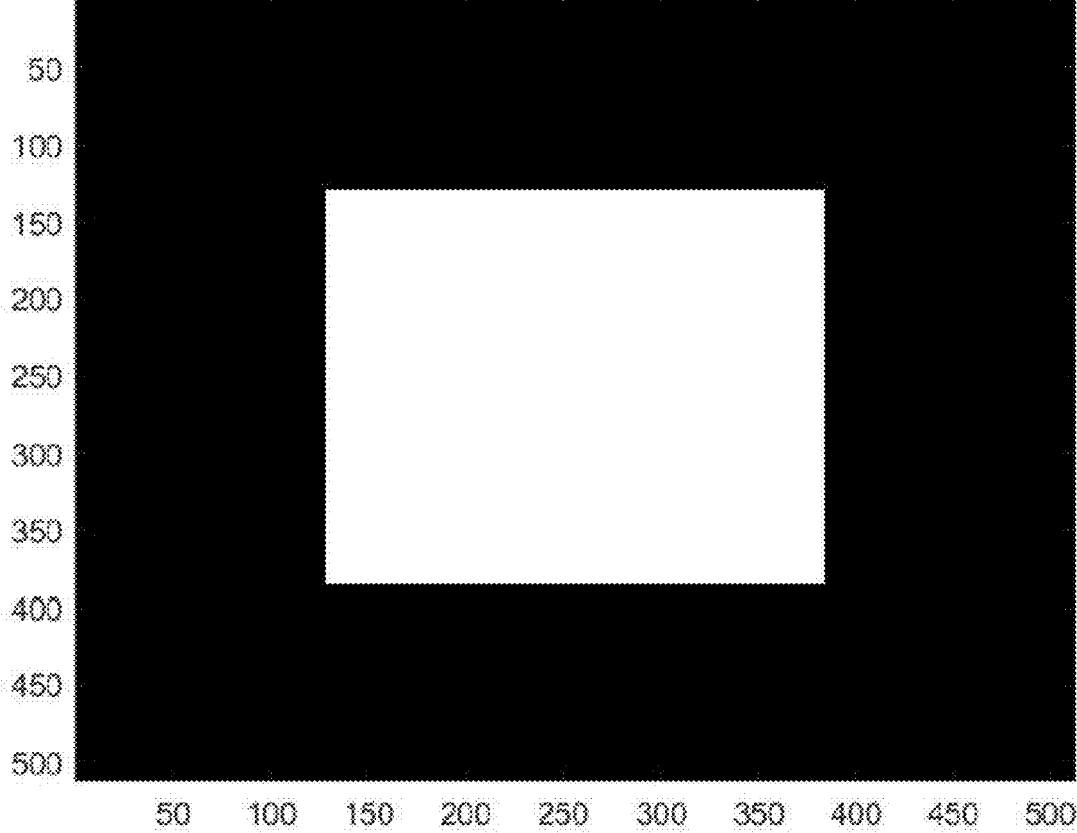
FIG. 56 displays a transparent mask according to an aspect of the disclosed method.
Figure 57:
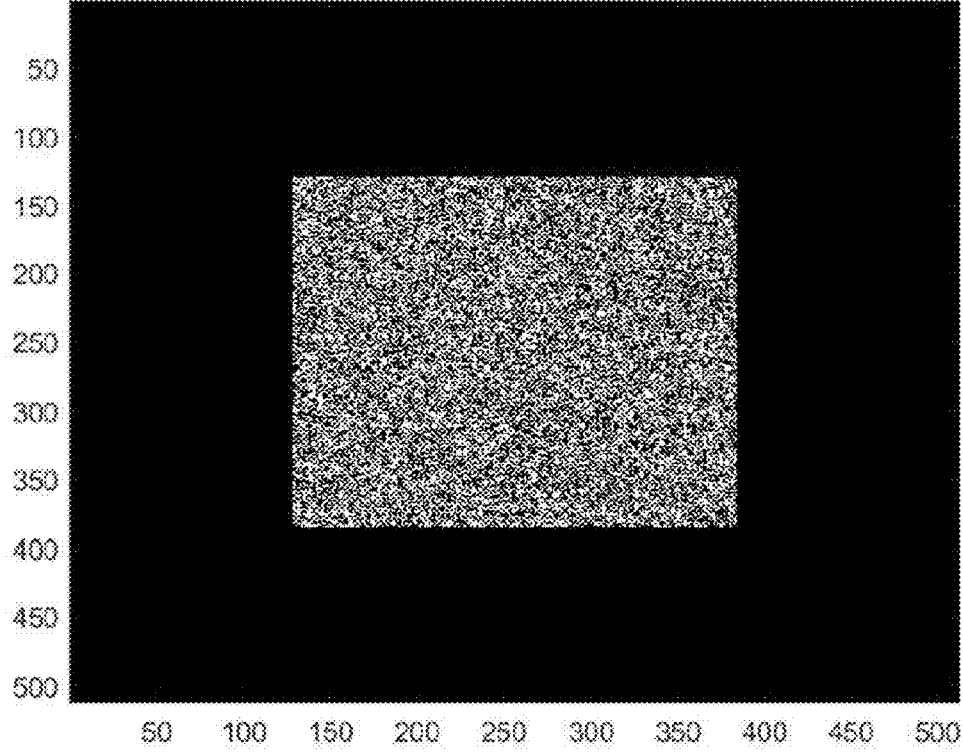
FIG. 57 displays a unipolar mask according to an aspect of the disclosed method.

In the experiments, one transparent mask and 9 pairs of complimentary unipolar binary masks were used. The transparent mask and one of the unipolar masks are shown in FIG. 56 and FIG. 57.

Figure 38:
FIG. 38 displays the original Lena image as system input.
Figure 39:
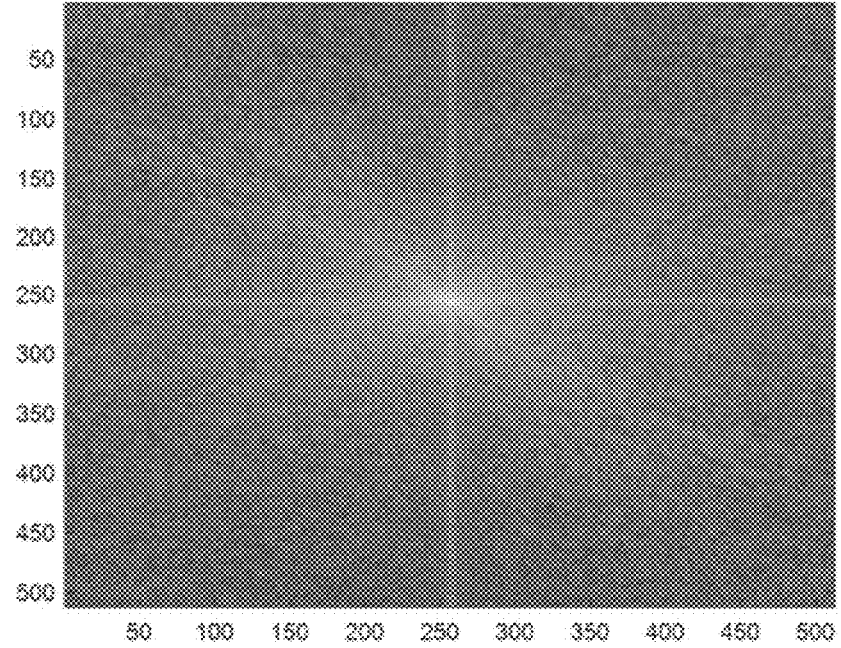
FIG. 39 displays the original log absolute spectrum of the Lena image.
Figure 40:
FIG. 40 displays the lowpass image due to the transparent window.
Figure 41:
FIG. 41 displays the deconvolved lowpass image by using H'(·).
Figure 42:
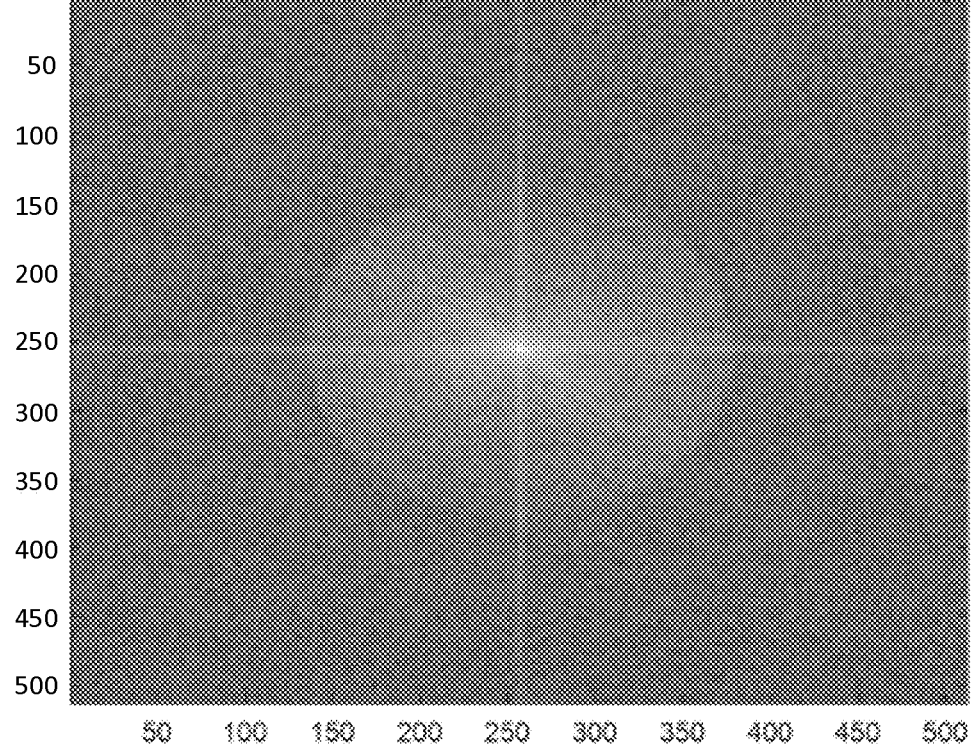
FIG. 42 displays the log absolute spectrum of deconvolved lowpass image using H'(·).

FIG. 38 shows the original Lena image. FIG. 39 shows the corresponding log absolute spectral image. The lowpass image when using the transparent mask is shown in FIG. 40. The deconvolved lowpass image by using H'(·) and Eq. (29) is shown in FIG. 41. The result is not satisfactory. The spectrum of deconvolved lowpass image by using H'(·) in FIG. 42 reconfirms this conclusion.

Figure 43:
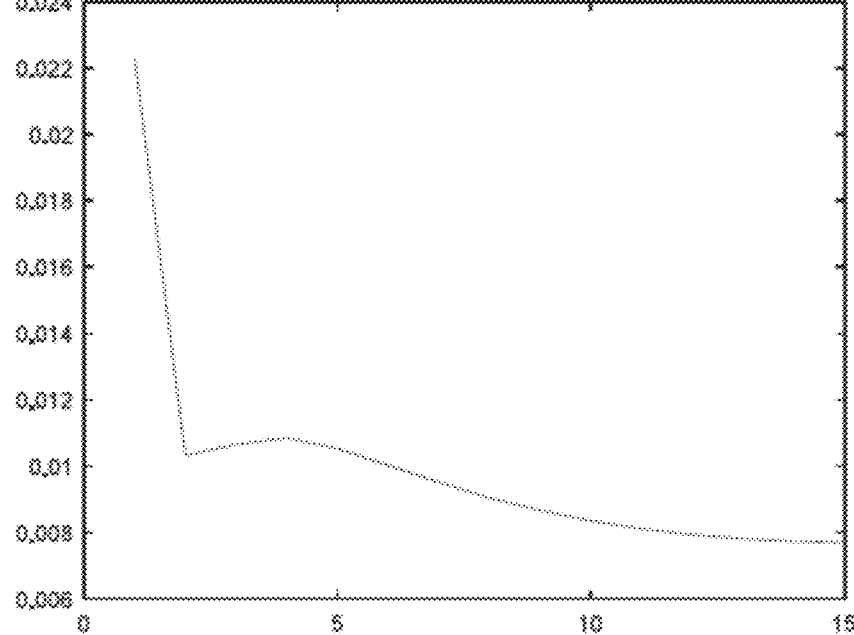
FIG. 43 shows the results for the mean square error versus iteration in the recovery of the Lena image.
Figure 44:
FIG. 44 displays the recovered Lena image.
Figure 45:
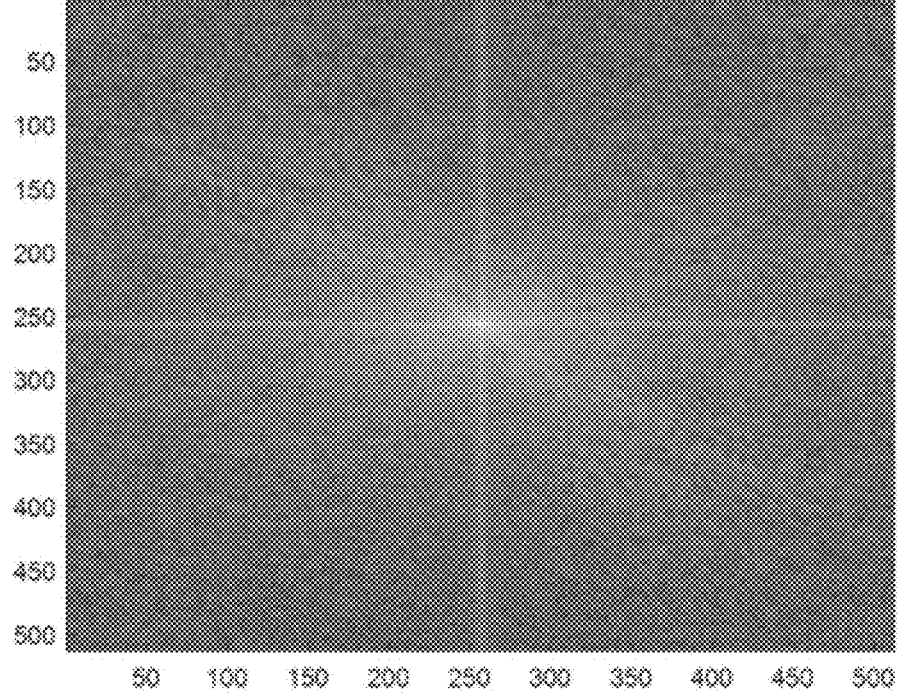
FIG. 45 displays the log absolute spectrum of the recovered Lena image.

Next the MPIR method is completed. FIG. 43 shows the mean square error versus iteration in the recovery of the Lena image. FIG. 44 shows the recovered Lena image. It is observed that the quality of the recovered image is excellent. FIG. 45 shows the log absolute spectrum of the recovered Lena image. It is observed that it is essentially the same as the original log absolute spectrum of the Lena image in FIG. 39.

Incompletely Known Optical Transfer Functions 2

Figure 46:
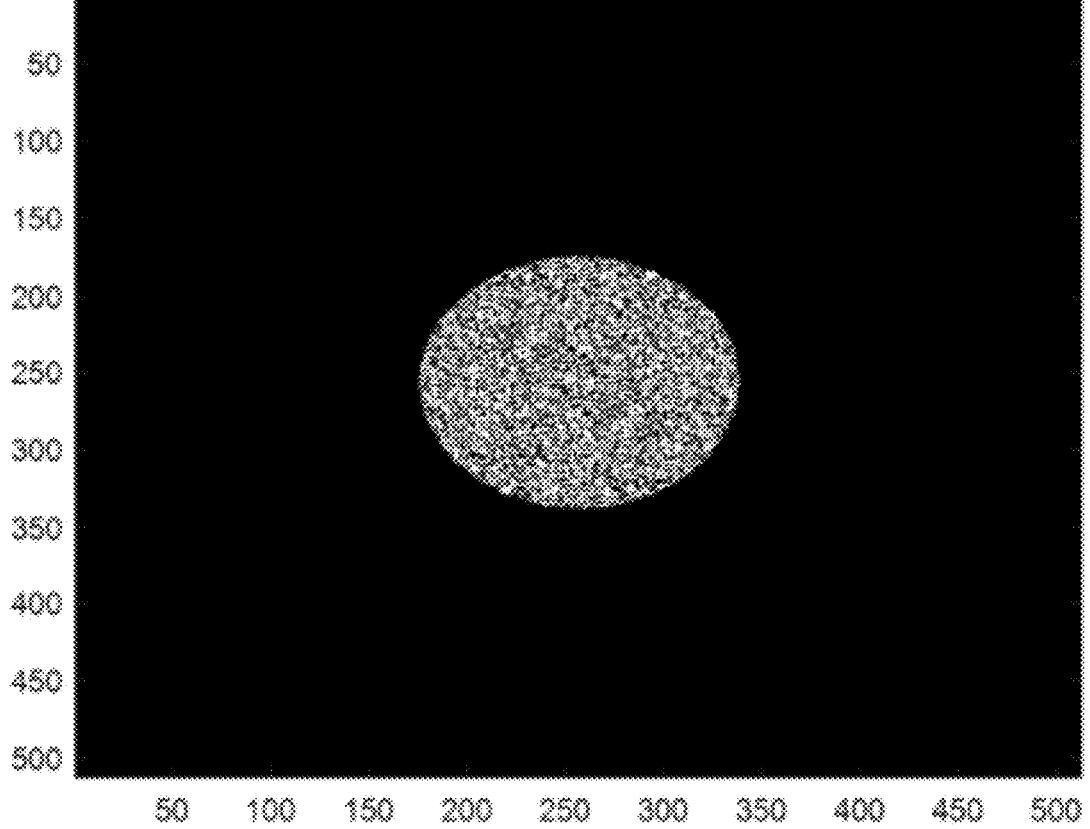
FIG. 46 displays the OTF with zeroed (black) pixels corresponding to missing information.
Figure 47:
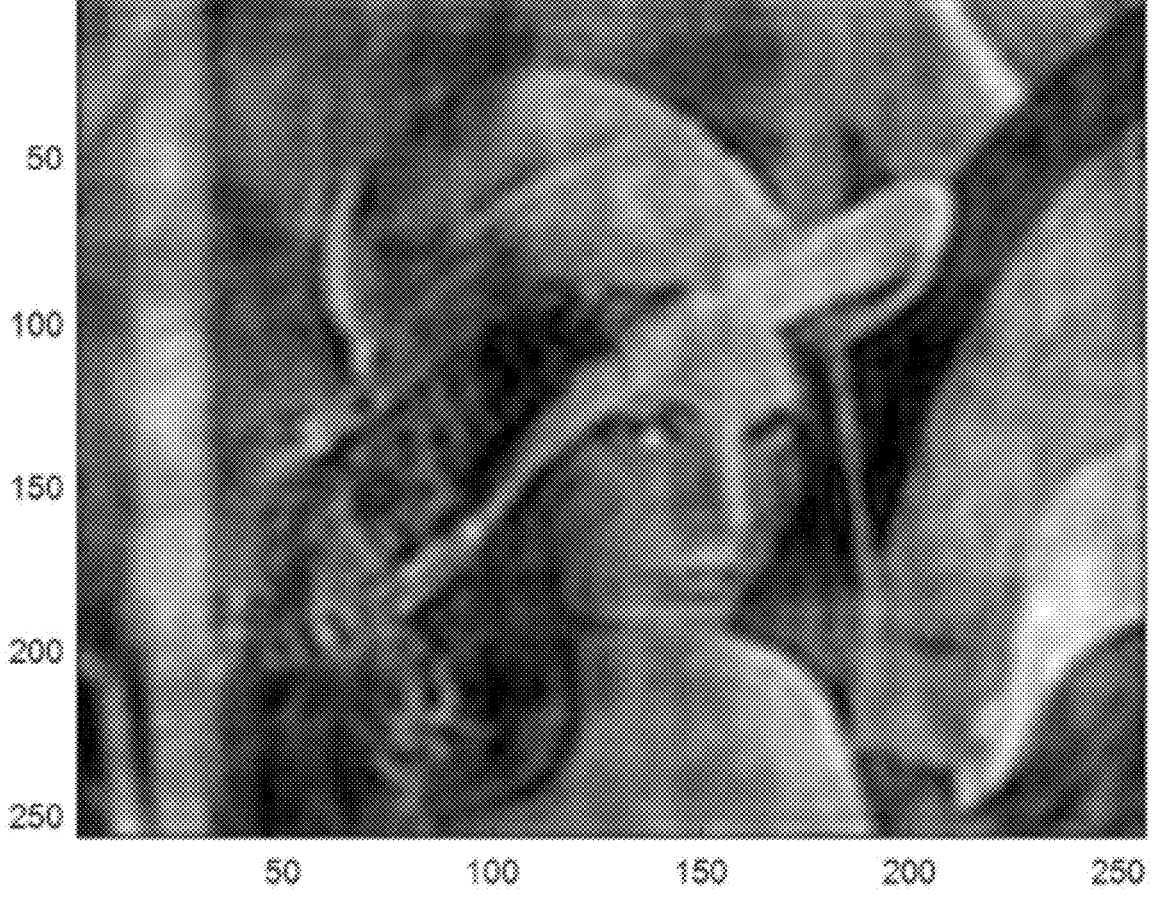
FIG. 47 displays the lowpass image due to the transparent window.
Figure 48:
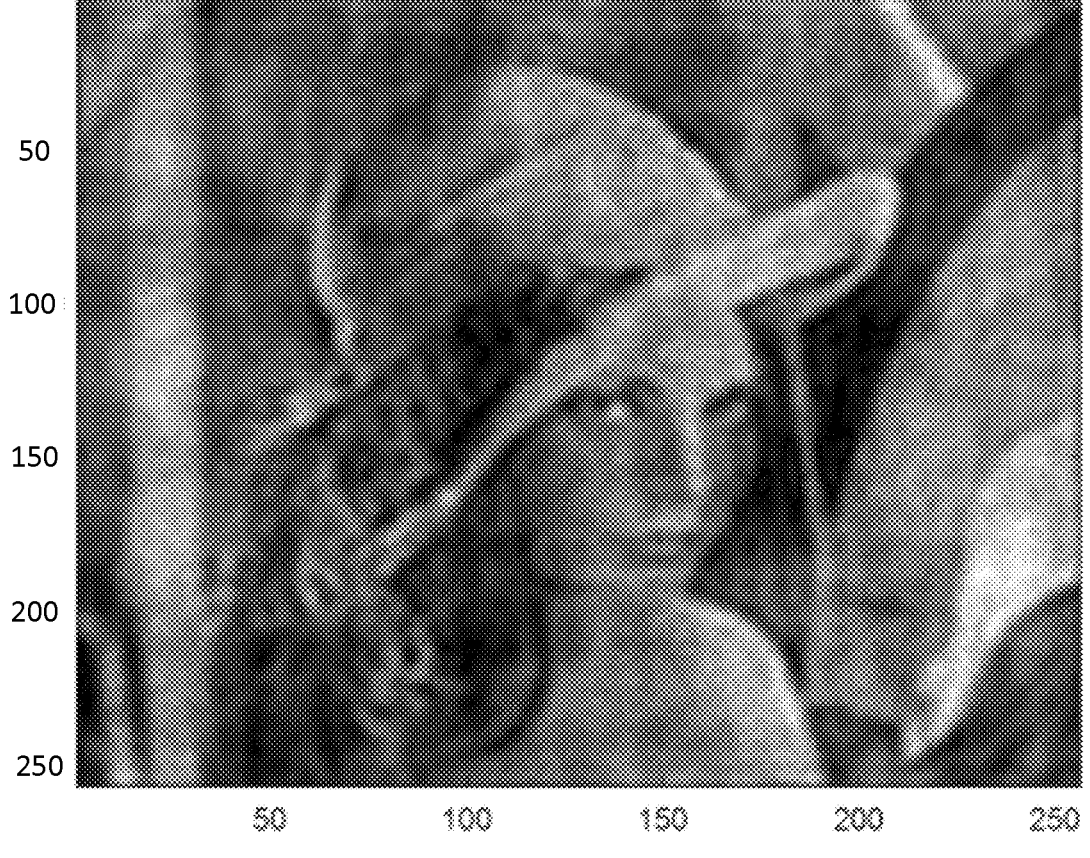
FIG. 48 displays the recovered Lena image with the known part of the OTF by inverse filtering.

In order to find out how the IT method works when parts of the CTF are unknown or incorrectly known, zeroes were introduced on the CTF plane. The Lena image was used in the experiments. The number of pixels on the CTF plane was 512×512=262,144. The number of zeroes was controlled by a fraction number r=0.1, 0.2, . . . , 0.9. In other words, r indicates the fraction of pixels of the CTF which were zeroed. For example, when r=0.3, about 117750 zeroes were created, corresponding to the missing information at these OTF pixels. The same experiment with NA=0.20 illustrated in FIG. 38 to FIG. 45 was run, with less information on CTF due to the missing pixels corresponding to the zeroed pixels. FIG. 46 shows the CTF with zeroed (black) pixels corresponding to missing information. FIG. 47 shows the lowpass image due to the transparent window.

Figure 49:
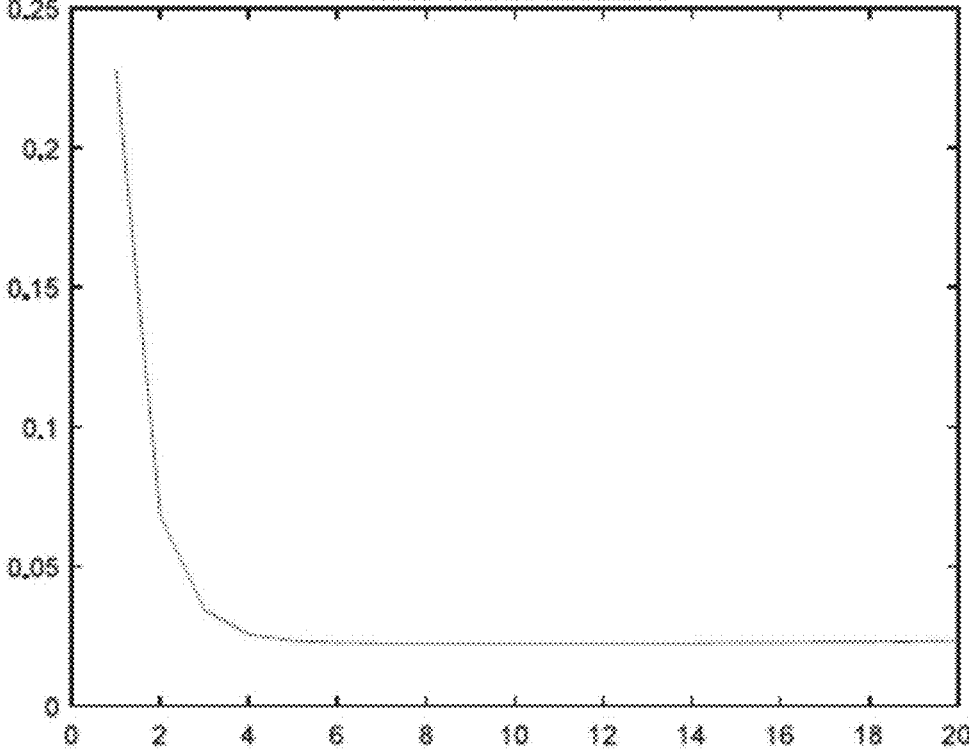
FIG. 49 shows the results for the mean square error versus iteration in the recovery of the Lena image when OTF is partially known.
Figure 50:
FIG. 50 displays the recovered Lena image when the coherent transfer function (CTF) is partially known.
Figure 51:
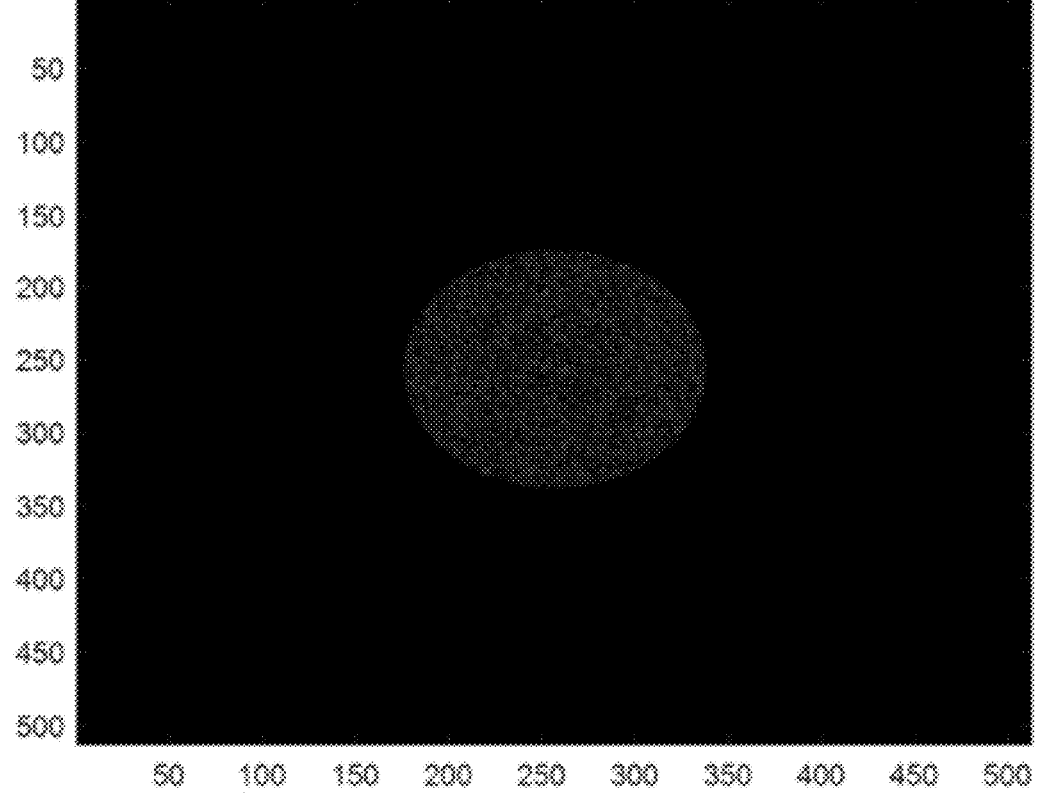
FIG. 51 displays the estimated CTF after the recovery of the input Lena image.

FIG. 49 shows the recovered Lena image with only the known part of the CTF by inverse filtering. It is observed that the result is not satisfactory. FIG. 50 shows the mean square error versus iteration in the recovery of the Lena image with the CT2 iterative method when CTF was partially known. FIG. 51 shows the recovered Lena image in this case. It is observed to be quite good. This result shows that the CT2 iterative method is effective in recovering the original image with sufficient accuracy as long as the missing CTF information is not too excessive. Once the recovered input image is available, the true CTF can be estimated by dividing the spectrum of the estimated image by the spectrum of the measured output image. Since a number of output images corresponding to the masked input images are available, this process can be carried out with all the available input-output pairs, and the results can be averaged as the estimate of the true CTF. FIG. 52 shows the true CTF estimate obtained. This actually corresponds to linear system identification when the system CTF is partially known.

Conclusions

This disclosure introduced 1-D and 2-D (or higher dimensional) incoherent totagraphy (IT) and coherent totagraphy (CT2) for superresolution imaging and signal processing of positive, real-valued images and signals. The main purpose is to recover high resolution information from low resolution information. IT and CT2 use iterative totagraphic optimization which involves averaging of information due to different masks in the input domain, and modifying information in the spectral domain by using two regions decided by the optical transfer function and coherent transfer function, respectively.

In both cases, the experimental results carried out with the Lena image resulted in high quality image recovery. The results were also very similar when the OTF or CTF was partially known as long as the missing information was not too excessive. Thresholding for known information for the method to function is discussed in more detail in [0138].

Once the input image was estimated, the true OTF was also estimated. This process corresponds to linear system identification when the system OTF is partially known. These results were very similar in the 2-D coherent case, and the case of 1-D signal processing with audio signals.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method for recovering missing spectral amplitude and phase information of an input signal, the method comprising:

providing at least one transformation unit with an input and an output;

providing at least three masks or illumination patterns, comprising a first transparent mask and a complementary pair of unipolar masks or illumination patterns, each of the at least three masks or illumination patterns configured to be disposed at the input;

separately multiplying the input with each of the at least three masks or illumination patterns to generate a modified input from each of the masks or illumination patterns;

convolving the modified inputs with a transfer function to yield outputs comprising positive real values to be detected by an output sensor, the transfer function comprising at least one invertible region and at least one non-invertible region;

passing the outputs through the at least one transformation unit, the at least one transformation unit configured to produce a spectral representation of each output corresponding to each modified input;

defining two regions of a recovered output comprising a plurality of points, divided into Region 1 in which the transfer function has known values which are invertible, and Region 2 in which the transfer function has very small, unknown or corrupted values;

computing amplitude and phase values of the points corresponding to Region 1 in each spectral representation;

setting an amplitude at each point in Region 2 of each spectral representation to be the mean amplitude computed over all points in Region 1 of the corresponding spectral representation, and setting a corresponding phase to a random value in [0,2π] for each point in Region 2 of the corresponding spectral representation to produce a set of modified spectral representations;

calculating an Inverse Fourier Transform of each of the modified spectral representations to obtain a set of candidate intermediate outputs;

averaging the candidate intermediate outputs to yield a single averaged candidate intermediate output;

providing the single averaged candidate intermediate output at an input plane and applying each of the at least three masks or illumination patterns to generate modified inputs from each of the masks or illumination patterns;

repeating the above steps, iteratively producing new candidate intermediate outputs by recalculating the values in Region 2 and replacing Region 1 with the original Region 1 until the candidate intermediate output values converge, yielding the recovered output.

2. The method of claim 1, wherein the complementary pair of unipolar masks or illumination patterns is a phase mask.

3. The method of claim 2, wherein the complementary pair of unipolar masks is replaced by a bipolar binary mask with elements equal to +1 or −1.

4. The method of claim 1, wherein the input signal is an image.

5. The method of claim 4, wherein the image is a real, positive valued image.

6. The method of claim 1, wherein the complementary pair of unipolar masks or illumination patterns is a set of illumination patterns.

7. The method of claim 1, further comprising the step of performing a Fourier transform of the outputs to produce the spectral representation of each output.

8. The method of claim 1, wherein the transfer function is an optical transfer function.

9. The method of claim 1, wherein the transfer function is a coherent transfer function.

\* \* \* \* \*